US012793085B2

(12) United States Patent
Jeske et al.

(10) Patent No.: US 12,793,085 B2
(45) **Date of Patent: *Nov. 10, 2026**

(54) MANAGEMENT OF PROGRAMMATIC AND COMPLIANCE WORKFLOWS USING ROBOTIC PROCESS AUTOMATION

(71) Applicant: The Toronto-Dominion Bank, Toronto (CA)

(72) Inventors: Heather May Jeske, Etobicoke (CA); Justin Leonard Lee, Toronto (CA); Avinash Malliah, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,585

(22) Filed: Jul. 15, 2024

(65) Prior Publication Data

US 2024/0370880 A1 Nov. 7, 2024

Related U.S. Application Data

(63) Continuation of application No. 17/030,753, filed on Sep. 24, 2020, now Pat. No. 12,067,580.

(51) Int. Cl.
*G06F 11/36* (2025.01)
*G06F 8/70* (2018.01)
(Continued)

(52) U.S. Cl.
CPC ............ *G06Q 30/018* (2013.01); *G06F 8/70* (2013.01); *G06F 9/45558* (2013.01);
(Continued)

(58) Field of Classification Search
CPC ...... G06F 11/36; G06F 11/3616; G06N 20/00
See application file for complete search history.

(56) References Cited

U.S. PATENT DOCUMENTS

| | | |
|---|---|---|
| 7,908,645 B2 | 3/2011 | Varghese |
| 8,060,438 B2 | 11/2011 | Dhar |

(Continued)

OTHER PUBLICATIONS

Kapoor, "Robotic Process Automation Game Changers Advance Financial Services Institutions Toward Intelligent Digital Workforce," Feb. 2019 (28 pages).

(Continued)

*Primary Examiner* — Kamini B Patel
(74) *Attorney, Agent, or Firm* — NIXON PEABODY LLP

(57) ABSTRACT

The disclosed embodiments include computer-implemented processes that manage adaptively queued compliance workflow through a virtualization of robotic process automation (RPA) techniques and that manage adaptively a testing and "de-risking" of target programmatic interfaces through a virtualization of additional RPA techniques. In some examples, an apparatus may obtain an element of response data from a programmatic interface based on a corresponding element of input data. The apparatus may determine that the element of response data deviates from an expected response of the programmatic interface to the element of input data, and generate exception data characterizing the determined deviation. The apparatus may also modify at least one functionality of the programmatic interface in accordance with the exception data and based on, for example, an application of a trained machine learning or artificial intelligence process to structured input data.

20 Claims, 11 Drawing Sheets

(51) Int. Cl.

| | |
|---|---|
| ***G06F 9/455*** | (2018.01) |
| ***G06F 11/3604*** | (2025.01) |
| ***G06N 20/00*** | (2019.01) |
| ***G06Q 30/018*** | (2023.01) |
| ***G06Q 40/02*** | (2023.01) |

(52) U.S. Cl.

CPC ......... *G06F 11/3616* (2013.01); *G06N 20/00* (2019.01); *G06Q 40/02* (2013.01)

(56) References Cited

U.S. PATENT DOCUMENTS

| | | | | |
|---|---|---|---|---|
| 9,094,434 | B2 | 7/2015 | Williams | |
| 9,239,668 | B2 * | 1/2016 | Zhang | H04M 1/72448 |
| 9,555,544 | B2 | 1/2017 | Bataller | |
| 9,779,429 | B2 * | 10/2017 | Borkowski | G06Q 30/0283 |
| 9,930,046 | B2 * | 3/2018 | Choe | G06F 21/12 |
| 10,354,225 | B2 * | 7/2019 | Sharma | B25J 9/1656 |
| 11,113,694 | B1 | 9/2021 | Somasundaram | |
| 12,067,580 | B2 * | 8/2024 | Jeske | G06Q 40/02 |
| 12,340,239 | B2 * | 6/2025 | Nikitin | G06F 8/77 |
| 2010/0004981 | A1 | 1/2010 | Katz | |
| 2013/0120156 | A1 | 5/2013 | Swaminathan | |
| 2015/0012919 | A1 | 1/2015 | Moss | |
| 2015/0378969 | A1 * | 12/2015 | Powell | G06F 16/23 715/234 |
| 2017/0237747 | A1 | 8/2017 | Quinn | |
| 2018/0288101 | A1 | 10/2018 | Sharma | |
| 2020/0167860 | A1 * | 5/2020 | Lau | H04L 9/3239 |
| 2020/0410583 | A1 * | 12/2020 | Hart | G06Q 20/405 |
| 2021/0126794 | A1 | 4/2021 | Forrester | |
| 2021/0334817 | A1 * | 10/2021 | Boston | G06Q 10/1093 |
| 2022/0092607 | A1 * | 3/2022 | Jeske | G06F 11/3616 |
| 2022/0108069 | A1 * | 4/2022 | Lee | G06N 20/00 |
| 2022/0198562 | A1 | 6/2022 | Cella | |
| 2022/0283844 | A1 * | 9/2022 | Draznin | H04L 41/122 |
| 2022/0284442 | A1 * | 9/2022 | Raman | G06Q 10/067 |
| 2022/0399494 | A1 | 12/2022 | Li et al. | |
| 2023/0173395 | A1 | 6/2023 | Cella | |
| 2023/0206329 | A1 | 6/2023 | Cella | |
| 2023/0214925 | A1 | 7/2023 | Cella | |
| 2024/0370880 | A1 * | 11/2024 | Jeske | G06Q 30/018 |
| 2024/0370881 | A1 * | 11/2024 | Jeske | G06Q 30/018 |
| 2025/0068550 | A1 * | 2/2025 | Dornal | G06V 10/74 |
| 2025/0088417 | A1 * | 3/2025 | Simeonov | H04L 41/028 |

OTHER PUBLICATIONS

Kofax, “Know Your Customer Automation,” 2017 (2 pages).

* cited by examiner

MANAGEMENT OF PROGRAMMATIC AND COMPLIANCE WORKFLOWS USING ROBOTIC PROCESS AUTOMATION

CROSS-REFERENCE TO RELATED APPLICATION

This application is a continuation of, and claims the benefit of priority to, U.S. application Ser. No. 17/030,753, filed Sep. 24, 2020, the disclosure of which is expressly incorporated herein by reference to its entirety.

TECHNICAL FIELD

The disclosed embodiments generally relate to computer-implemented systems and processes that manage programmatic and compliance workflow using robotic process automation.

BACKGROUND

Today, financial institutions selectively provision a variety of financial services to their customers upon approval of corresponding applications. For example, a potential business customer of a financial institution may submit electronically an application to access one or more financial products. To facilitate the approval of the application by the potential business customer, and the provisioning of the financial products to that customer, the financial institution must establish that the application, and the potential business customer, comply with one or more know-your-customer (KYC) policies and/or anti-money-laundering (AML) policies. To establish such compliance, many financial institutions request, and receive, elements of verification data from various computing systems via programmatic interfaces, and the testing, analysis, and de-risking of these programmatic interfaces represents an integral, and time- and resource-intensive, operation performed continuously by the financial institutions.

SUMMARY

In some examples, an apparatus includes a memory storing instructions and at least one processor coupled to the memory. The at least one processor is configured to execute the instructions to, based on data associated with a triggering event, provide an element of input data to a programmatic interface, and obtain an element of response data from the programmatic interface. The element of response data is generated by the programmatic interface based on the element of input data. The at least one processor is further configured to execute the instructions to determine that the element of response data deviates from an expected response of the programmatic interface to the element of input data, and generate exception data characterizing the determined deviation. Additionally, the at least one processor is configured to execute the instructions to perform operations that modify at least one functionality of the programmatic interface in accordance with the exception data.

In other examples, a computer-implemented method includes, based on data associated with a triggering event, and using at least one processor, providing an element of input data to a programmatic interface, and obtaining an element of response data from the programmatic interface. The element of response data is generated by the programmatic interface based on the element of input data. The computer-implemented method also includes, using the at least one processor, determining that the element of response data deviates from an expected response of the programmatic interface to the corresponding element of input data, and generating exception data characterizing the determined deviation. The computer-implemented method further includes performing, using the at least one processor, operations that modify at least one functionality of the programmatic interface in accordance with the exception data.

Additionally, in some examples, an apparatus includes a memory storing instructions, a communications interface, and at least one processor coupled to the communications interface and the memory. The at least one processor is configured to execute the instructions to obtain application data that includes an identifier of a business entity and via the communications interface, perform operations that (i) access a first graphical interface of a first application program executed at a first computing system, and (ii) based on the identifier, request, through the accessed first graphical interface, first verification data associated with the identifier. The first verification data is maintained by the first computing system. The at least one processor is further configured to execute the instructions to receive the first verification data from the first computing system via the communications interface. Based on the received first verification data and on second verification data associated with the business entity, the at least one processor is also configured to execute the instructions to determine that the application data is compliant with at least one of a policy or a restriction associated with the business entity, and generate compliance data indicative of the determined compliance. The at least one processor is further configured to execute the instructions to perform operations that store the application data and the compliance data within a portion of the memory.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to computer-implemented processes that, among other things, manage adaptively queued compliance workflow through a virtualization of robotic process automation (RPA) techniques and further, manage adaptively a testing and "de-risking" of target programmatic interfaces through a virtualization of additional RPA techniques.

Figure 1:
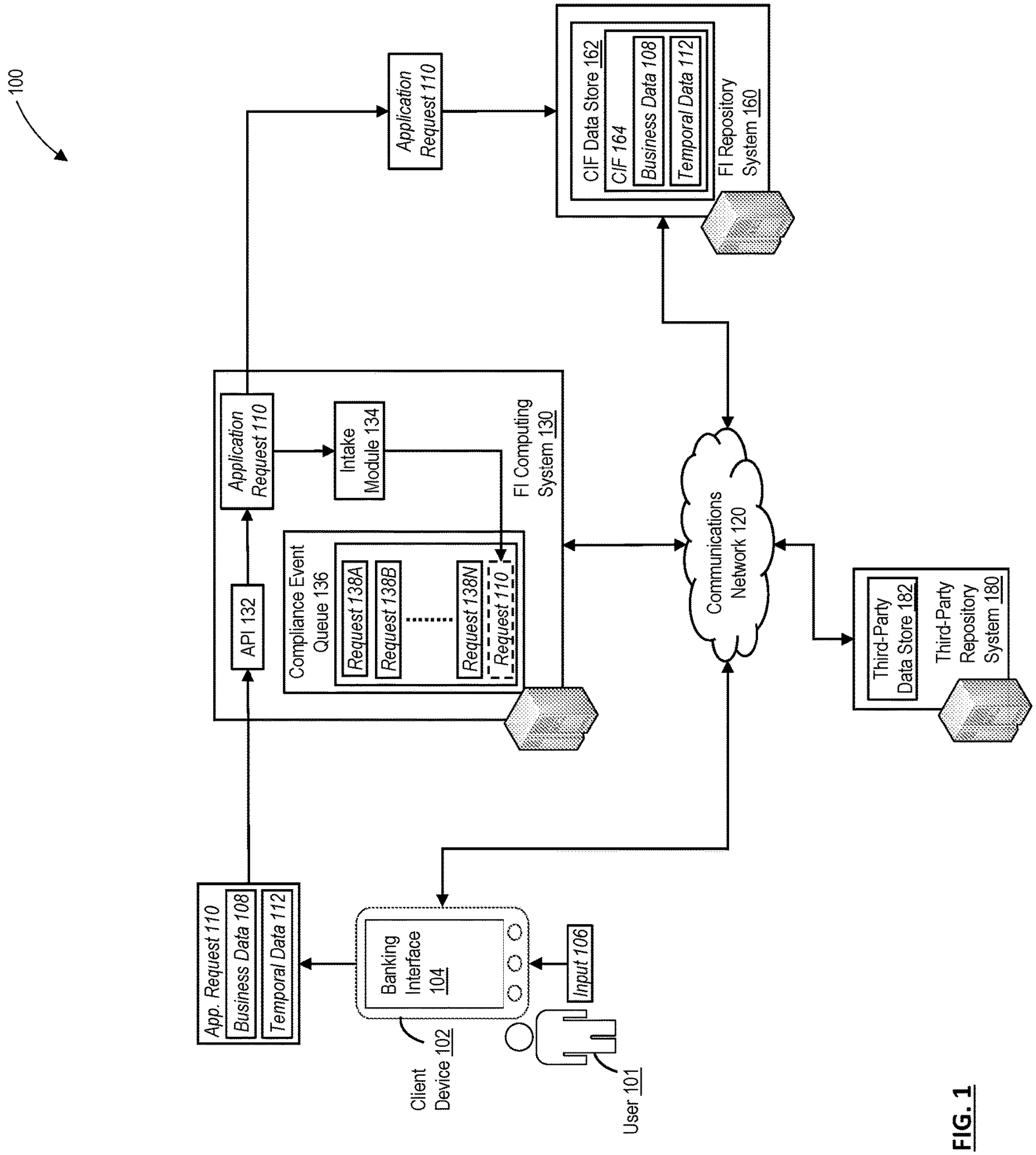
FIGS. 1, 2A, and 2B, are block diagrams illustrating portions of an exemplary computing environment, in accordance with some exemplary embodiments.
Figure 2A:
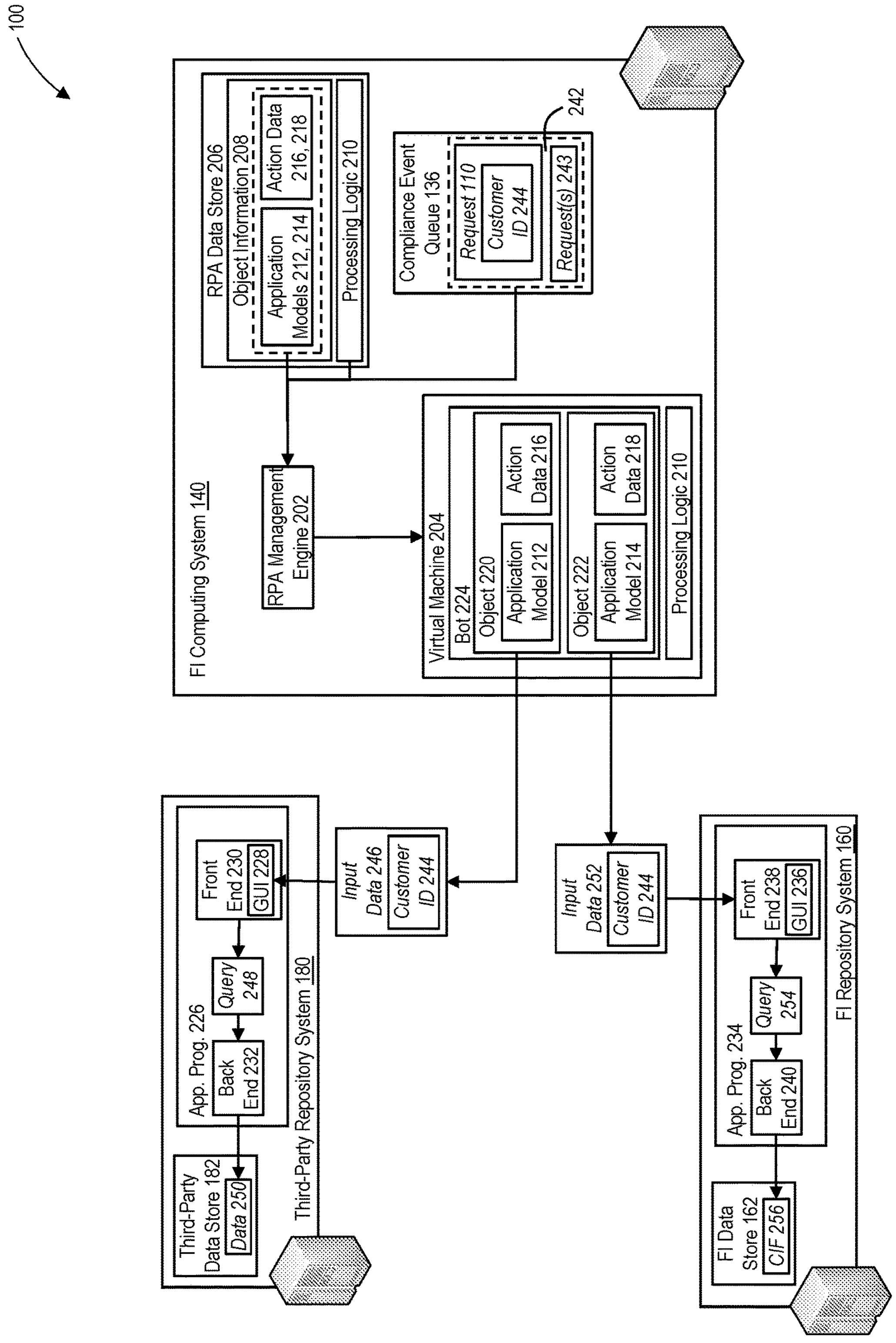
Figure 2B:
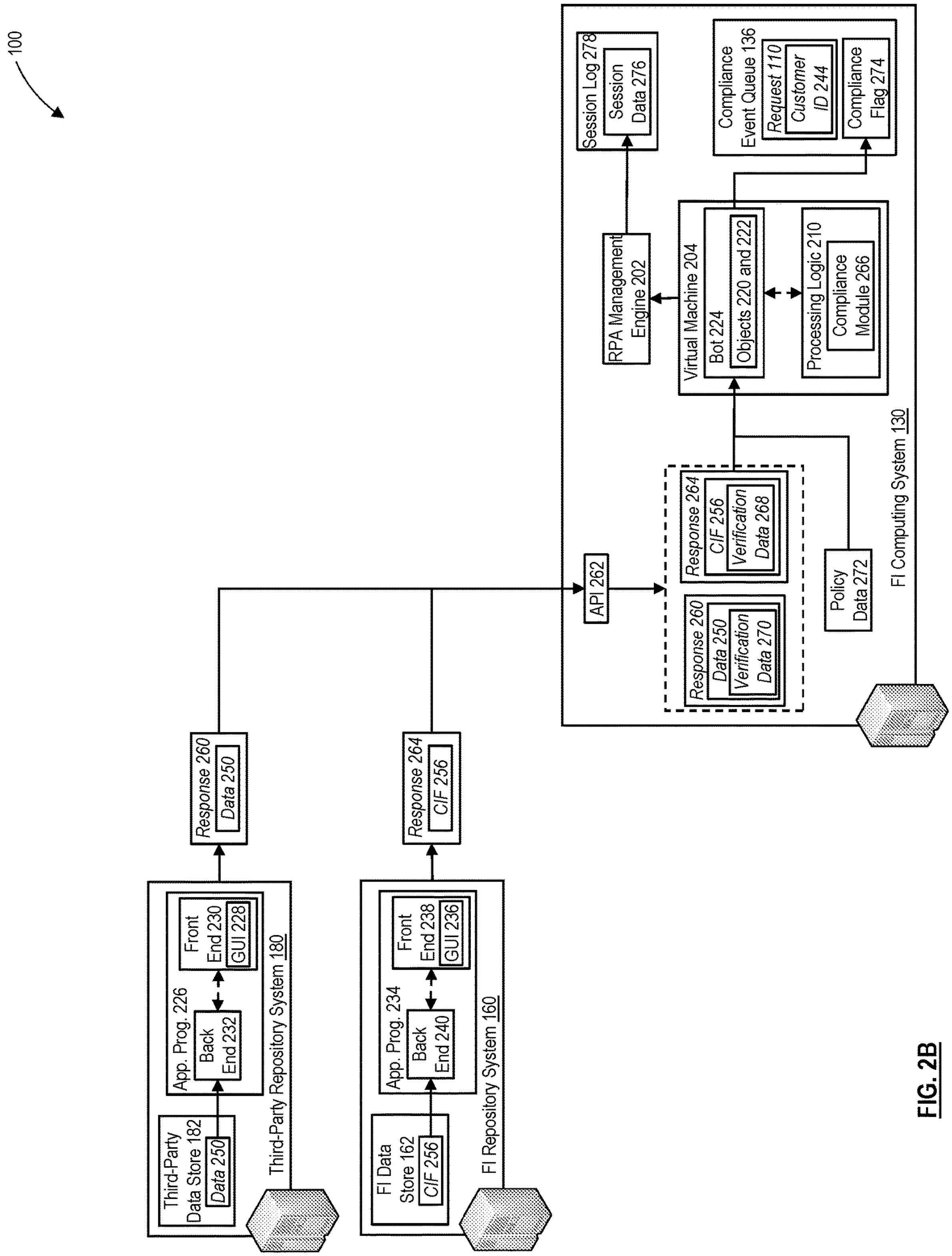

A. Exemplary Processes for Managing Queued Compliance Workflow Using Robotic Process Automation FIGS. 1, 2A, and 2B illustrate components of an exemplary computing environment 100, which perform computerized processes that, among other things, detect an occurrence of a compliance event initiated at a device, incorporate elements of data identifying the compliance event within a corresponding workflow queue, and manage adaptively an application of one or more compliance operations to the queued compliance workflow through a virtualization of robotic process automation (RPA) techniques, in accordance with some exemplary implementations. As described herein, the detection of the compliance event, and the application of one or more compliance operations to the detected compliance event, may represent an integral portion of the business operations implemented across many modern organizations, such as financial institutions.

For example, and prior to establishing a relationship with a particular business, a financial institution must establish that an application of the business to access certain financial services (e.g., a business checking account, a revolving line-of-credit, etc.) complies with one or more know-your-customer (KYC) policies or anti-money-laundering (AML) policies imposed internally by the financial institution or by external regulators or governmental entities. In some instances, a representative of the financial institution may inspect the application to obtain elements of information that characterize the business (e.g., a business name, address, entity type, etc.), and the representative may access, via a web browser executed by a computing device or system, web pages, graphical user interfaces (GUIs), or other digital portals associated with various data repositories maintained by the financial institution (e.g., maintaining customer data, such as digital customer information files (CIFs) and other external sources of information (e.g., governmental entities)), and obtain elements of verification information that identify or characterize the business. Based on a comparison between the elements of information obtained from the application and the verification information obtained from the various data repositories, the representative may perform operations that establish a compliance of the business, and the application, with each of the imposed KYC and AML policies.

In other instances, a computing system associated with, operated by, the financial institution may, upon execution of an application program, perform operations that establish a secure channel of communications with each of the data repositories via a corresponding programmatic interface, such as, but not limited to, an application programming interface (API). For example, and upon receipt of application data associated with the business, the executed application program may parse the application data and extract the elements of information that characterize the business (e.g., a business name, address, entity type, etc.). Further, the executed application program may cause the computing system to request, and receive, the elements of the verification information that characterize the business from the data repositories via corresponding ones of the programmatic interfaces, e.g., across a communications network. The executed application may perform further operations that establish programmatically the compliance of the business, and the application, with each of the imposed KYC and AML policies based on a comparison between the elements of business information obtained from the application data and the elements of verification information obtained from the various data repositories.

While the operations performed manually by representatives of the financial institution, and additionally, or alternatively, the operations performed programmatically by computing systems of the financial institution, may establish a compliance of a received application and corresponding business with each of the imposed KYC and AML processes, these manual or programmatic operations may be repeated hundreds or thousands of times daily in response to the receipt of each of the applications for business-banking services at the financial institution. Further, and in addition to consuming significant amounts of the representatives' workdays, these manually implemented operations may also result in wide, but unintended, distribution of confidential business information throughout the financial institution, which may increase a likelihood of a misuse or an unauthorized distribution of that confidential customer information.

Moreover, and to facilitate the implementation of these programmatic operations by the computing systems of the financial institution, each of the data repositories may perform operations that publicize, or render accessible, data characterizing corresponding ones of the programmatic interfaces, such as, but not limited to, specification data identifying a composition or format of input to a corresponding API, or specification data identifying a structure and format of an expected output of that corresponding API. In some instances, the exposure of these programmatic interfaces to one or more of the FI computing systems may establish a direct, and potentially more damaging, level of access to the functionalities of these programmatic interfaces, and may increase a likelihood of attacks by malicious third parties when compared to the operations that access confidential, business-specific data maintained by the data repositories with corresponding graphical user interfaces (GUIs) or digital portals.

Certain of the exemplary processes described herein may virtualize and automate certain operations performed manually by the representatives of the financial institution through an instantiation of one or more virtual machines at a computing system of the financial institution and through an implementation, by each of the instantiated virtual machines, of robotic process automation (RPA) techniques. By way of example, and as described herein, these RPA techniques, when implemented by each of the instantiated virtual machines, may enable each of the virtual machines to execute one or more software robots (e.g., "bots") that, among other things, access a graphical user interface (GUI) or other digital portal of one or more of the data repositories based on a corresponding application model (e.g., that establishes the structure, layout, or input format associated with interface elements disposed across various display screens of the GUI or digital portal) and corresponding elements of processing logic (e.g., that establishes and specifies points of interaction between the corresponding bots and the interface elements of the GUI or digital portal), and obtain one or more elements of confidential, business-specific data associated corresponding applications within an allocated portion of queued application data.

In some instances, the processing logic associated with the GUI or digital portal of each data repository may incorporate a subset of those operations performed manually by representatives of the financial institution when accessing the corresponding GUI or digital portion, such as, but not limited to, a streamlined, optimized, or aggregated subset of the manually performed operations. As such, when the "bot" executed by an instantiated virtual machine accesses programmatically the GUI or digital portal of a data repository based on the corresponding processing logic, the executed bot may obtain the elements of confidential, business-specific data associated with each allocated application using fewer discrete interactions with the interface elements of the GUI or digital portal, and fewer corresponding computational operations, than would be required for a corresponding manual implementation.

Furthermore, as certain of the exemplary processes described herein enable each of the instantiated virtual machines to access programmatically one or more of the data repositories through a corresponding GUI or digital portal in accordance with respective application models and elements of processing logic, these exemplary processes may reduce a likelihood of attacks by malicious third parties, and increase a security and confidentiality of the underlying elements of business-specific data, when compared to conventional processes that rely on exposed programmatic interfaces. Thus, certain of these exemplary processes may be implemented in addition to, or as an alternate to, conventional automated processes that access elements of business-specific data programmatically through corresponding APIs.

Referring back to FIG. 1, environment 100 may include a client device 102, such as a smart phone, tablet computer, wearable device, or other computing device, one or more computing systems associated with a financial institution, such as financial-institution (FI) system 130 and FI repository system 160, and a third-party repository system 180, each of which may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some instances, client device 102 may be associated with, or operable by, a user 101, and may include one or more tangible, non-transitory memories that store data and/or software instructions and one or more processors configured to execute the software instructions. The stored software instructions may include one or more application programs, one or more application modules, or other elements of code executable by the one or more processors, examples of which include, but are not limited to, a web browser (e.g., Google Chrome™, Apple Safari™, etc.) or a mobile banking application associated with the financial institution (e.g., and provisioned to client device 102 by FI computing system 130). For example, user 101 may be associated with, or employed by, a corresponding business entity, and via the executed web browser or mobile banking application, user 101 may access and interact with a digital interface that facilitates a submission of an application for business-banking services at the financial institution.

Client device 102 may also include a communications interface, such as one or more wireless transceivers, coupled to the one or more processors for accommodating wired or wireless internet communication with other computing systems and devices operating within environment 100. Further, client device 102 may also include a display unit coupled to the one or more processors and configured to present interface elements to user 101, and one or more input units coupled to the one or more processors and configured to receive input from user 101. By way of example, the display unit may include, but is not limited to, an LCD display, a TFT display, and OLED display, or other appropriate type of display unit, and one or more input units may include, but are not limited to, a keypad, keyboard, touchscreen, fingerprint scanner, microphone, voice activated control technology, stylus, or any other appropriate type of input unit. Further, in some examples, the functionalities of the display and input units may be combined into a single device, such as a pressure-sensitive touchscreen display unit that can present interface elements and can detect an input from user 101 via a physical touch.

As described herein, each of FI computing system 130, FI repository system 160, and third-party repository system 180 may represent a computing system that includes one or more servers and tangible, non-transitory memory devices storing executable code and application modules. Further, the one or more servers may each include one or more processors, which may be configured to execute portions of the stored code or application modules to perform operations consistent with the disclosed embodiments. Each of FI computing system 130, FI repository system 160, and third-party repository system 180 may also include a communications interface, such as one or more wireless transceivers, coupled to the one or more processors for accommodating wired or wireless internet communication with other computing systems and devices operating within environment 100.

FI computing system 130 and FI repository system 160 may can be incorporated into a single computing system, although in other instances, FI computing system 130 and FI repository system 160 may correspond to a distributed system that includes computing components distributed across communications network 120, such as those described herein, or those provided or maintained by cloud-service providers (e.g., Google Cloud™, Microsoft Azure™, etc.). The disclosed embodiments are, however, not limited to these exemplary distributed systems, and in other instances, FI computing system 130, FI repository system 160, and third-party repository system 180 may include computing components disposed within any additional or alternate number or type of computing systems or across any appropriate network.

In some instances, each of FI computing system 130 and FI repository system 160 may be associated with, or operated by, the financial institution, which provides financial services to one or more customers, such as the business associated with or represented by user 101. Examples of these financial services include, but are not limited to, establishing and maintaining a financial services account on behalf of the corresponding business (e.g., a business checking account, etc.), establishing and maintaining a revolving line-of-credit or other credit facility on behalf of the business, or servicing inquiries related to any of the financial services described herein.

Further, FI computing system 130 may perform any of the exemplary processes described herein to establish that an application by a potential business customer to access certain of these financial services (e.g., a business checking account, a revolving line-of-credit, etc.) complies with one or more of the KYC policies or AML policies imposed internally by the financial institution or by external regulators or governmental entities. In some instances, and to facilitate the performance of these exemplary processes by FI computing system 130, each of FI repository system 160 and third-party repository system 180 may maintain, within corresponding ones of the tangible, non-transitory memories, elements of business information characterizing one or more current, prior, or candidate business customers of the financial institution.

For example, as illustrated in FIG. 1, FI repository system 160 may maintain, within the one or more tangible, non-transitory memories, a data repository that stores one or more customer information files (CIFs) associated with current, prior, or potential customer of the financial institution, e.g., CIF data store 162. Each of the CIFs may be associated with a corresponding one of the current or potential customers of the financial institution, and may include structured or unstructured data records that are populated with elements of information that identify the corresponding one of the current or potential customers (e.g., a unique alphanumeric identifier assigned to a business customer, a business name, a business address, a corporate status characterizing the business (a corporation, partnership, limited-liability corporation, etc.), or a jurisdiction associated with the business customer (a state or province of incorporation, etc.)) and in some instances, that identify interactions between the corresponding one of the current or potential customers and the financial institution (e.g., a submission date of an application for business-banking services, dates of prior applications, etc.).

Further, third-party repository system 180 may be associated with, or operated by, one or more third-parties unrelated to the financial institution, such as a governmental or regulatory entity, and may maintain, within the one or more tangible, non-transitory memories, a third-party data store 182 that stores additional elements of information identifying and characterizing the current or potential customers of the financial institution. For example, third-party repository system 180 may be associated with an agency of a state or provincial government that establishes, registers, and monitors incorporated business entities, and third-party data store 182 may maintain data records that specify, for a particular business, a business name, a business address, a corporate status (a corporation, partnership, limited-liability corporation, etc.), or a jurisdiction associated with that corporate status (a state or province of incorporation, etc.)). In some instances, and through an implementation of any of the exemplary RPA techniques described herein, FI computing system 130 may establish that an application by a potential business customer for financial services (e.g., a business checking account, a revolving line-of-credit, etc.) complies with one or more of the imposed KYC policies or AML policies based on a comparison between a corresponding one of the CIFs maintained within CIF data store 162 and corresponding elements of verification information maintained within third-party data store 182.

Referring back to FIG. 1, user 101 may provide input to client device 102, e.g., via the input unit, that requests an execution of the web browser or mobile banking application, and upon execution, the web browser or mobile banking application may perform operations that generate and render one or more interface elements for presentation on a corresponding digital interface 104, e.g., via the corresponding display unit. In some instances, digital interface 104 may include interface elements that facilitate an application, by the potential business customer associated with or represented by user 101, to access one or more financial services available at the financial institution, and may prompt user 101 to provide further input to client device 102, e.g., via the input unit, that specifies information identifying and characterizing the potential business customer.

For example, and responsive to the interface elements within digital interface 104, user 101 may provide additional input 106 that, among other things, identifies a name of the potential business customer (e.g., "ACME Inc."), a current business address (e.g., "1234 Main Street, Washington, D.C., 20005), a corporate status of the potential business customer (e.g., "corporation"), and jurisdiction associated with that corporate status (e.g., "Delaware"). Client device 102 may receive additional input 106, and the executed web browser or mobile banking application may process additional input 106 and render all, or a selected portion, or additional input 106 for presentation within digital interface 104. Additionally, the executed web browser or mobile banking application may also perform operations that generate elements of business data 108 that include all, or a selected portion of additional input 106 (e.g., the business name, the current business address, the corporate status, and/or the jurisdiction), and that package, into corresponding portions of an application request 110, business data 108 and temporal data 112 specifying a time or data associated with the application by the potential business customer for the financial services.

In some instances, the executed web browser or mobile banking application may perform operations that cause client device 102 to transmit application request 110 across network 120 to FI computing system 130. Further, although not illustrated in FIG. 1, the executed web browser or mobile banking application may also perform operations that encrypt all or a selected portion of application request 110 prior to transmission across network 120 (e.g., using a public cryptographic key distributed to the components of environment 100 by FI computing system 130) and additionally, or alternatively, may apply a digital signature to application request 110 prior to transmission across network 120 using any appropriate digital signature process (e.g., based on a private cryptographic key maintained at client device 102 on behalf of the executed web browser or mobile banking application). Additionally, in some instances, the executed web browser or mobile banking application may also perform operations that package, into application request, a digital token, cryptogram, or other elements of cryptographic data that uniquely identifies the executed web browser or mobile banking application at FI computing system 130, such as, but not limited to, an OAuth token indicative of a successful outcome of a token-based authentication and consent protocol.

As illustrated in FIG. 1, a programmatic interface established and maintained at FI computing system 130, such as application programming interface (API) 132, may receive application request 110 (which includes business data 108 and temporal data 112), and may route application request 110 to one or more application programs or program modules executed by FI computing system, such as executed intake module 134. In some instances, executed intake module 134 may perform operations that decrypt application request 110 using a private cryptographic key maintained within the one or more tangible, non-transitory memories of FI computing system 130 (not illustrated in FIG. 1), and additionally, or alternatively, may verify the applied digital signature using a public key certificate associated with client device 102, or may verify that a structure or composition of the digital token, cryptogram, or other elements of cryptographic data associated with the executed web browser or mobile banking application is consistent with an expected structure or format.

Executed intake module 134 may also perform operations that store application request 110, which includes business data 108 and temporal data 112, within a corresponding portion of the one or more tangible, non-transitory memories, e.g., within structured or unstructured data records of an application data store (not illustrated in FIG. 1). In some instances, as illustrated in FIG. 1, executed intake application 134 may perform operations that cause FI computing system 130 to transmit all, or a selected portion, of application request 110 to FI repository system 160, e.g., across network 120 or an appropriate secure, private network interconnected FI computing system 130 and FI repository system 160. FI repository system 160 may receive application request 110 through a corresponding programmatic interface (not illustrated in FIG. 1), and may parse application request 110 to extract business data 108 and temporal data 112. Further, in some examples, FI repository system 160 may perform operations that package business data 108 and temporal data 112 into corresponding portions of a customer information file (CIF) 164 for the potential business customer, and that store CIF 164 within a corresponding portion of CIF data store 162.

In further instances, executed intake module 134 may also perform operations that access, within the one or more tangible, non-transitory memories of FI computing system 130, a compliance event queue 136 that includes one or more queued application requests received previously by FI computing system 130 during prior temporal intervals and prioritized for compliance processing in accordance with the imposed KYC or AML policies described herein. Each of the previously received application requests, e.g., application requests 138A, 138B, . . . , and 138N of FIG. 1, may include elements of business data characterizing a potential business customer of the financial institution and temporal data specifying a time or date of the corresponding application request. Further, in some examples, each of the previously received application requests may prioritized and ordered within compliance event queue 136 in accordance with a temporal metric, such as the date or time associated with the corresponding application, a geographic metric, such as the jurisdiction associated with the corresponding business, or any additional or alternate prioritization metric associated with the applications for financial services available at the financial institution or the potential business customers associated with the previously received application requests.

For example, executed intake module 134 may access compliance event queue 136, and based on the corresponding elements of temporal data maintained within application requests 138A, 138B, . . . , and 138N, executed intake module 134 may determine that application requests 138A, 138B, . . . , and 138N are ordered in accordance with an application time or date, with application request 138A being associated with an "earliest" application request (and as such, a "longest" pendency in compliance event queue 136), and with application request 138N being associated with a "most recent" application request (and as such, a "shortest" pendency in compliance event queue 136). Based on temporal data 112 within application request 110, executed intake module 134 may perform operations that modify compliance event queue 136 to include application request 110 at a corresponding position within the temporally prioritized application requests, e.g., at a position in compliance event queue 136 subsequent to application request 138N, which indicates that application request 110 now represents the "most recent" application request.

As described below in reference to FIGS. 2A-2C, FI computing system 130 may perform operations that instantiate or clone one or more virtual machines, which may be provisioned with corresponding elements of object and action data and elements of processing logic that, collectively, enable these instantiated virtual machines to execute corresponding programmatic software robots (e.g., "bots). These executed programmatic "bots" may, for example, implement one or more exemplary robotic process automation (RPA) techniques that, as described herein, access graphical user interfaces (GUIs) or digital portals established and maintained by application programs executed at corresponding ones of FI repository system 160 or third-party repository system 180, and request and receive elements of confidential business information associated with each prioritized request within a selectively allocated subset of the queued application requests (e.g., business information maintained with corresponding CIFs of CIF data store 162, and business information maintained within the structured or unstructured data records of third-party data store 182).

In some instances, the virtualized implementation of these exemplary RPA techniques by FI computing system 130 may reduce the number of discrete interactions between computing systems of the financial institution and the GUIs or digital portals of FI repository system 160 or third-party repository system 180, and as such, the number of discrete computational operations by these computing systems, required to access and obtain the confidential business data that establishes the compliance of each of the queued application requests, and as such, each of the potential business customers, within the imposed KYC or AML policies. Additionally, and as described herein, the virtualized implementation of these exemplary RPA techniques by FI computing system 130 may also reduce unauthorized access to, and distribution of, confidential business information within the financial institution (e.g., due to a reduction in an exposure of this information among representatives of the financial institution), and further, may reduce a likelihood of attacks by malicious third parties on FI repository system 160 and third-party repository system 180, and increase a security and confidentiality of the underlying elements of business information at FI repository system 160 and third-party repository system 180 (e.g., due to a reduction in an exposure of corresponding application programming interfaces across network 120).

Referring to FIG. 2A, the one or more processors of FI computing system 130 may execute an RPA management engine 202, which may perform operations that instantiate (or clone) one or more virtual machines at FI computing system 130, and that manage an execution of, and a selective allocation of subsets of the queued application requests to, each of the instantiated virtual machines. For example, executed RPA management engine 202 may perform operations that instantiate virtual machine 204, and additionally, or alternatively, may clone virtual machine 204 from one or more previously instantiated virtual machines (not illustrated in FIG. 2A). In other examples, also not illustrated in FIG. 2A, executed RPA management engine 202 may perform operations that instantiate and/or clone a plurality of virtual machines executing at FI computing system 130, including virtual machine 204. Further, each of the instantiated virtual machines may execute one or more programmatic software robots (e.g., programmatic "bots"), and the executed programmatic bots may be configured by the elements of processing logic to perform operations that obtain, from corresponding ones of FI repository system 160 or third-party repository system 180, elements of confidential customer information associated with each of the allocated application requests, e.g., using any of the exemplary RPA techniques described herein.

Each of the executed programmatic bots may include, and may be established by, one or more corresponding executable objects, and the elements of processing logic may encode sequential operations performed by corresponding ones of the objects. Further, the executable objects may be configured by the elements of the processing logic to interact with one or more application programs executed by corresponding ones of FI repository system 160 or third-party repository system 180, and to perform actions or operations specified by the elements of processing logic, such as, but not limited to, logging into a GUI or digital portal, requesting and retrieving elements of the confidential customer or verification data (e.g., from corresponding ones of the CIFs maintained within CIF data store 162, or from corresponding ones of the structured or unstructured data record of third-party data store 182), and logging out of the corresponding GUI or digital portal.

To facilitate such interaction, the executable objects may include, and may be defined by, corresponding application models and corresponding elements of action data. By way of example, and for a particular one of the executable objects, the application model may expose that object the application program executed by one of FI repository system 160 or third-party repository system 180, and may identify and characterize interface elements displayed within one or more display screens of the corresponding GUI or digital portal (e.g., a type of interface element, an appropriate format or structure of input data, etc.). Further, and for the particular executable object, the elements of action data may identify those discrete or sequential actions that the object can perform during interaction with the application program and in accordance with the application model.

As illustrated in FIG. 2A, executed RPA management engine 202 may perform operations that access an RPA data store 206 maintained within the one or more tangible, non-transitory memories of FI computing system 130, and that provision, to instantiated virtual machine 204, object information 208 and one or more elements of processing logic 210. In some instances, object information 208 may include a plurality of application models, such as application models 212 and 214, and a plurality of elements of action data, such as action data elements 216, and 218, and virtual machine 204 may process object information 208 and perform operations that generate executable objects based on respective pairs of the application models and elements of action data. For example, virtual machine 204 may process object information 208 and perform operations that generate a first executable object 220 based on application model 212 and action data element 216, and that generate a second executable object 222 based on application model 214 and action data elements 218.

Further, virtual machine 204 may also perform operations that generate one or more programmatic software robots, e.g., "bots," that include each of, or selected subsets of, the executable objects. For example, as illustrated in FIG. 2A, virtual machine 204 may perform operations that establish a programmatic software robot, e.g., bot 224, that includes executable objects 220 and 222. The disclosed embodiments are, however, not limited to the generation of a single bot that includes both executable objects 220 and 222, and in other examples, virtual machine 204 may perform operations that generate any number of additional or alternate programmatic software robots that include, respectively, a selected one of executable objects 220 or 222, or alternatively, each of executable objects 220 and 222.

By way of example, application model 212 may expose executable object 220 to an application program executed by third-party repository system 180, such as application program 226, and may identify and characterize interface elements displayed within one or more display screens of a GUI or digital portal generated by application program 226, such GUI 228 generated and presented by front-end 230 of executed application program 226. Further, and as described herein, a data repository maintained at third-party repository system 180, such as third-party data store 182, may include one or more elements of third-party data identifying and characterizing one or more businesses or business entities, and examples of the third-party data may include, for a particular business, a business name, a business address, a corporate status (a corporation, partnership, limited-liability corporation, etc.), and/or a jurisdiction associated with that corporate status (a state or province of incorporation, etc.)). In some instances, executed application program 226 may include an application back-end 232 that selectively provisions, or denies, requests to access to the elements of the third-party data received by application front-end 230, e.g., based on input to the interface elements of GUI 228.

Further, in some examples, application model 214 may expose executable object 222 to an application program executed by FI repository system 160, such as application program 234, and may identify and characterize interface elements displayed within one or more display screens of a GUI or digital portal generated by application program 234, such GUI 236 generated and presented by a front-end 238 of executed application program 234. As described herein, a data repository maintained at FI repository system 160, such as CIF data store 162, may store one or more customer information files (CIFs) associated with current and potential customers of the financial institution, including the potential business customers described herein, and each of the CIFs may include structured or unstructured data records that are populated with elements of information that identify and characterize corresponding ones of the current or potential customers, and additionally, or alternatively, the interactions of the current or potential customers with the financial institution (e.g., a submission date of an application for business-banking services, dates of prior applications, etc.). In some instances, executed application program 234 may also include an application back-end 240 that selectively provisions, or denies, requests to access the CIF files received by application front-end 230, e.g., based on input to the interface elements of GUI 228.

Additionally, executed RPA management engine 202 may also perform operations that allocate selectively, to each of the executed virtual machines, a subset of those prioritized and queued application requests maintained within compliance event queue 136 and awaiting processing for compliance with the imposed KYC or AML policies described herein. For example, and as illustrated in FIG. 2A, executed RPA management engine 202 may allocate, to virtual machine 204, a subset 242 of the queued application requests within compliance event queue that includes, but is not limited to, queued application request 110 and one or more additional queued application requests, such as queued application request(s) 243. In some instances, executed RPA management engine 202 may allocate, to each of the virtual machines, including virtual machine 204, a predetermined and static number of the queued application requests. In other instances, consistent with the disclosed exemplary embodiments, executed RPA management engine 202 may adaptively allocate the queued application requests to each of the instantiated or cloned virtual machines, including virtual machine 204, based on, among other things, a prior performance of that virtual machine (e.g., as specified by locally maintained elements of session data), based on computational resources assigned to that virtual machine (e.g., an amount of available memory, etc.), or based on application-specific criteria (e.g., a corresponding business location, structure, or jurisdiction, etc.).

In some instances, the one or more elements of processing logic 210 may cause executed programmatic bot 224 to select an initial one of subset 242 of queued application requests, e.g., application request 110, for processing to establish compliance with the KYC or AML policies imposed on or by the financial institution. For example, and as described herein, application request 110 may correspond to a request, by a potential business customer (e.g., "ACME, Inc."), to access one or more financial services or products offered by the financial institution to its business customers. Application request 110 may include, for example, the name of the business name of the business (e.g., "ACME Inc."), a current address of the business (e.g., "1234 Main Street, Washington, D.C., 20005), a corporate status of the business (e.g., "corporation"), and jurisdiction associated with that corporate status (e.g., "Delaware"). Further, in additional examples, application request 110 may also include temporal data that characterizes a time or date at which the business submitted application request 110 to the financial institution (e.g., vi client device 102 using any of the processes described herein), along with additional information that characterizes one or more financial services or products requested by the business.

The one or more elements of processing logic 210 may also encode sequential operations that, when performed by executed programmatic bot 224, cause executable object 220 to access GUI 228 of executed application program 226, and to request and receive, via accessed GUI 228, one or more elements of third-party data maintained at third-party repository system 180 (e.g., within third-party data store 182) that identify and characterize the potential business customer associated with application request 110. Additionally, the one or more elements of processing logic 210 may encode further sequential operations that, when performed by executed programmatic bot 224, cause executable object 222 to access GUI 236 of executed application program 234, and to request and receive, via accessed GUI 236, one or more portions of a customer information file (CIF) maintained at FI repository system 160 (e.g., within CIF data store 162) that is associated with the potential business customer. In some instances, and consistent with the one or more elements of processing logic 210, executed programmatic bot 224 may perform any of the exemplary processes described herein to verify a compliance with the imposed KYC or AML policies based on the requested, and received, elements of third-party data and the portions of the CIF associated with the potential business customer.

Further, and consistent with the one or more elements of processing logic 210, executed programmatic bot 224 may perform any of the exemplary processes described herein to: (i) request, and receive, elements of third-party data (e.g., maintained within third-party data store 182) associated with each additional, or alternate, one of the queued application requests within allocated subset 242 via programmatic interactions with GUI 228; (ii) request, and receive, portions of CIFs (e.g., maintained within CIF data store 162) associated with each of the additional, or alternate, ones of the queued application requests within allocated subset 242 via programmatic interactions with GUI 236; and (iii) to verify a compliance of each of the additional, or alternate, ones of the queued application requests with the imposed AML or KYC policies based corresponding elements of the third-party data and corresponding portions of the CIFs. The verification of the compliance of each of the queued application requests allocated to virtual machine 204 may, for example, represent a prerequisite for further processing, and eventual acceptance or denial, of these application requests by FI computing system 130.

Referring back to FIG. 2A, executed programmatic bot 224 may parse application request 110 and obtain one or more identifiers of the potential business customer associated with application request 110, e.g., customer identifier(s) 244. For example, customer identifier(s) 244 may include the name of the business (e.g., "ACME, Inc.") and additionally, or alternatively, all or a selected portion of the address of the business (e.g., all or a selected portion of "1234 Main Street, Washington, D.C., 20005). In some instances, executed programmatic bot 224 may establish communications with third-party repository system 180, and may perform operations that cause executable object 220 to access GUI 228 associated with executed application program 226. Executed programmatic bot 224 may perform also operations (not illustrated in FIG. 2A) that cause executable object 220 to provide, as an input to accessed GUI 228, one or more elements of credential data associated with FI computing system 130, e.g., a login credential and an alphanumeric password assigned to FI computing system 130 by executed application program 226.

Based upon a successful authentication of the elements of credential data by application program 226, executed programmatic bot 224 may perform additional operations that cause executable object 220 to provide, as input to GUI 228, information that identifies and requests one or more elements of the third-party data associated with the potential business customer and maintained at third-party repository system 128. The provisioned input may, for example, include all or a selected portions of customer identifier(s) 244, and a format or structure of each of element of the provisioned input, including customer identifier(s) 244, may be consistent with application model 212, which identifies and characterizes the interface elements displayed within one or more display screens of GUI 228, and/or action data 216, which specifies one or more actions capable of performance by executable object 220 during interaction with GUI 228.

For example, as illustrated in FIG. 2A, executed programmatic bot 224 may perform operations that generate input data 246, which requests, from third-party repository system 180, the one or more elements of third-party data that identify and characterize the potential business customer associated with application request 110. Executed programmatic bot 224 may package all, or a selected portion of, customer identifier(s) 244 into corresponding portions of input data 246, and may transmit input data 246 across network 120 to third-party repository system 180, e.g., as additional input to GUI 228. In some instances, third-party repository system 180 may receive input data 246, and application front-end 230 of executed application program 226 may process input data 246 (e.g., as provisioned to GUI 228), and may generate a corresponding query 248 for the requested elements of third-party data associated with the potential business customer and maintained at third-party repository system 180. Query 248 may, for example, include all or a selected portion of customer identifier(s) 244, and application front-end 230 may provide query 248 as an input to application back-end 232 of executed application program 226.

Application back-end 232 may, for example, perform operations that access third-party data store 182, and identify one or more elements of third-party data, e.g., third-party data 250, that are consistent with query 248. For example, query 248 may include the name of the potential business customer (e.g., "ACME, Inc.") included within application request 110, and application back-end 232 may perform operations that identify third-party data 250 based on its inclusion of, or reference to, each portion of the name of the potential business customer (e.g., based on a determination that third-party data 250 represents a complete match to query 248). In other examples, application back-end 232 may perform operations that identify third-party data 250 based on its inclusion of, or reference to, one or more portion of the name of the potential business customer (e.g., "ACME," but not "Inc.," etc.), and as such, third-party data 250 may represent a partial match to query 248.

Further, application back-end 232 may perform operations that extract third-party data 250 from third-party data store 182, and that perform any of the exemplary processes described herein to package third-party data 250 into a corresponding portion of a response to query 248 and to transmit the response across network 120 to FI computing system 130 (e.g., as illustrated in FIG. 2B). The disclosed embodiments are, however, not limited to processes through which application back-end 240 identifies a single complete or partial match to query 248 within the records of third-party data store 182, and in other instances, application back-end 240 may perform any of the exemplary processes described herein to generate a response to query 248 that include any additional or alternate elements of the third-party data (e.g., as maintained within third-party data store 180) representing complete or partial matches to query 248.

As further illustrated in FIG. 2A, executed programmatic bot 224 may establish communications with FI repository system 160, and may perform operations that cause executable object 222 to access GUI 236 associated with executed application program 234. Executed programmatic bot 224 may perform also operations (not illustrated in FIG. 2A) that cause executable object 222 to provide, as an input to accessed GUI 236, one or more elements of credential data associated with FI computing system 130, e.g., a login credential and an alphanumeric password assigned to FI computing system 130 by executed application program 234. Based upon a successful authentication of the elements of credential data by application program 234, executed programmatic bot 224 may perform additional operations that cause executable object 222 to provide, as input to GUI 236, information that identifies and requests a portion of one or more CIFs associated with the potential business customer and maintained at FI repository system 160. The provisioned input may, for example, include all or a selected portions of customer identifier(s) 244, and a format or structure of each of element of the provisioned input, including customer identifier(s) 244, may be consistent with application model 214, which identifies and characterizes the interface elements displayed within one or more display screens of GUI 236, and/or action data 218, which specifies one or more actions capable of performance by executable object 222 during interaction with GUI 236.

In some instances, executed programmatic bot 224 may perform operations that generate input data 252, which requests, from FI repository system 160, the portions of the one or more CIFs that identify and characterize the potential business customer associated with application request 110. Executed programmatic bot 224 may package all, or a selected portion of, customer identifier(s) 244 into corresponding portions of input data 252, and may transmit input data 252 across network 120 to FI repository system 160, e.g., as additional input to GUI 236. In some instances, FI repository system 160 may receive input data 252, and application front-end 238 of executed application program 234 may process input data 252 (e.g., as provisioned to GUI 236), and may generate a corresponding query 254 for the requested portions of the CIFs associated with the potential business customer and maintained at FI repository system 160. Query 254 may, for example, include all or a selected portion of customer identifier(s) 244, and application front-end 238 may provide query 254 as an input to application back-end 240 of executed application program 234.

Application back-end 240 may, for example, perform operations that access CIF data store 162, and identify one or more of the locally maintained CIFs that are consistent with query 254. As described herein, query 254 may include the name of the potential business customer (e.g., "ACME, Inc.") included within application request 110, and application back-end 232 may perform operations that parse the CIFs locally maintained within CIF data store 162 to identify a corresponding one of the CIFs that includes the name of the potential business customer, e.g., CIF 256. Application back-end 240 may perform further operations that access the CIF 256, which identifies and characterizes the potential business customer associated with application request 110, and package all, or a selected portion of, CIF 256 into a response to query 254, which FI repository system 160 may transmit across network 120 to FI computing system 130 (e.g., as illustrated in FIG. 2B). For example, the selected portion of CIF 256, which application back-end 240 packages into the response, may include, among other things, the business name, an address of the business, a corporate structure of the business, of a jurisdiction associated with that corporate structure, but may exclude information characterizing the interactions between that potential business customer and the financial institution.

Referring to FIG. 2B, application back-end 232 (e.g., of application program 226 executed by third-party repository system 180) may perform operations that extract third-party data 250 from third-party data store 182, and that package third-party data 250 into corresponding portions of a response to query 248, e.g., within response 260, which third-party repository system 180 may transmit across network 120 to FI computing system 130. Third-party data 250 may, for example, include the business name (e.g., "ACME, Inc."), the business address (e.g., "1234 Main Street, Washington, D.C., 20005"), the corporate status of the business (e.g., a corporation), the jurisdiction associated with that corporate status (e.g., Delaware), and additional, or alternate information characterizing the business or the corporate status, such as names of one or more directors. In some instances, response 260 may include, or represent, a report structured in accordance with one or more standardized document formats associated with, or recognized by, the financial institution, such as, but not limited to, a business status report (BSR) or a business status details report (BSDR) structured in a portable document format (PDF). Application back-end 232 may, for example, perform operations that process third-party data 250 and generate the corresponding PDF report (e.g., the BSR or BSDR), and transmit the generated PDF report across network 120 to FI computing system 130, e.g., as a portion of response 260.

A programmatic interface established and maintained by FI computing system 130, such application programming interface (API) 262 associated with virtual machine 204, may receive response 260 (including third-party data 250), and may route response 260 to executed virtual machine 204. In some instances, not illustrated in FIG. 2B, executed virtual machine 204 may perform operations that cause programmatic bot 224 to provide additional input data to third-party repository system 180 that logs out of GUI 228, e.g., in accordance with application model 212 and processing logic 210, and to store response 260 within an accessible portion of the one or more tangible, non-transitory memories.

Further, application back end 240 (e.g., of application program 234 executed by FI repository system 160) may perform operations that extract CIF 256 from CIF data store 162, and that package all, or a selected portion, of CIF 256 into a response to query 254, e.g., within response 264. As described herein, the portions of CIF 256 packaged into response 264, may include, among other things, the business name, an address of the business, a corporate structure of the business, of a jurisdiction associated with that corporate structure, but may exclude information characterizing the interactions between that potential business customer and the financial institution. In some instances, FI repository system 160 may transmit response 264 across network 120 to FI computing system 130, and API 262 may receive and route response 264 (including the portions of CIF 256) to executed virtual machine 204. Although not illustrated in FIG. 2B, executed virtual machine 204 may perform operations that cause programmatic bot 224 to provide additional input data to FI repository system 160 that logs out of GUI 236, e.g., in accordance with application model 214 and processing logic 210, and to store response 264 within the accessible portion of the one or more tangible, non-transitory memories.

In some instances, virtual machine 204 may perform certain of the exemplary processes described herein in sequence to request and receive, from third-party repository system 180, the elements of third-party data 250 identifying and characterizing the potential business customer associated with application request 110, prior to requesting and receiving, from FI repository system 160, the portions of CIF 256 identifying and characterizing the potential business customer (e.g., executed virtual machine 204 may perform the exemplary processes described herein to log out of GUI 228 prior to establishing communications with GUI 236). In other instances, and consistent with the one or more elements of processing logic 210, virtual machine 204 may perform certain of these processes in parallel, e.g., to perform operations that request and receive the elements of third-party data 250 from third-party repository system 180, and the request and receive the portions of CIF 256 from FI repository system 160, in parallel and simultaneously or near simultaneously.

Referring back to FIG. 2B, and consistent with the one or more elements of processing logic 210, executed programmatic bot 224 may perform operations that parse responses 260 and 264 (e.g., as maintained within the accessible portions of the one or more tangible, non-transitory memories of FI computing system 130) and extract respective ones of the elements of third-party data 250 and the portions of CIF 256. In some instances, response 260 may include a PDF document or report, e.g., the BSR or BSDR reports described herein, and executed programmatic bot 224 may perform additional operations that apply one or more optical character recognition (OCR) processes to response 260 to obtain all, or a subset of, the elements of third-party data 250.

As described herein, the elements of third-party data 250 may be obtained from third-party repository system 180, which maintains data identifying and characterizing one or more business and business and business entities on behalf of a corresponding governmental or regulatory entity. For example, the corresponding governmental or regulatory entity may include, but is not limited to, an agency of a state or provincial government that establishes, registers, and monitors incorporated business and business entities. Further, and as described herein, the portions of CIF 256 may be obtained from FI repository system 130, which may be associated with or maintained by the financial institution, and the portions of CIF 256 may be generated by FI repository system 160 upon submission of application request 110 to FI computing system 130. In some instances, executed programmatic bot 224 may perform operations consistent with the one or more elements of processing logic 210 that establish a compliance of application request 110, and as such, the potential business customer, with the imposed KYC or AML policies based on a determined consistency between the portions of CIF data 256 and the elements of third-party data 250.

By way of example, and consistent with the one or more elements of processing logic 210, a compliance module 266 of executed programmatic bot 224 may perform operations that extract, from CIF 256, elements of verification data 268 that characterize the potential business customer (e.g., as submitted within application request 110), and that extract, from third-party data 250, elements of verification data 270 that identify and characterize the potential business customer at the governmental or regulatory entity associated with third-party repository system 180. In some instances, each of verification data 268 and 270 may include a corresponding name of the potential business customer, a corresponding business address of the potential business customer, a corresponding corporate status of the potential business customer, a corresponding jurisdiction associated with that corporate status, and additionally, or alternatively, information characterizing the business or the corporate status, such as names of one or more directors.

Further, and consistent with the one or more elements of processing logic 210, compliance module 266 may access elements of policy data 272 that identify and characterize the KCY or AML policies imposed on the potential business customer by the financial institution (e.g., as maintained within an accessible portion of the one or more tangible, non-transitory memories of FI computing system 130). In some examples, the KYC or AML policies specified within policy data 272 may require that each of the data elements that identify and characterize the potential business customer within verification data 268 (e.g., as specified by that business customer within application request 110) may a corresponding one of the data elements within verification data 270 (e.g., as obtained from third-party repository system 180). In other examples, the KYC or AML policies may require a partial correspondence between the data elements maintained, respectively, within verification data 268 and 270. For instance, the KYC or AML policies may require that the respective data elements of verification data 268 and 270 each specify a common name, corporate status, and associated jurisdiction for the potential business customer, but may tolerate variations in a corresponding business address or set of director names. The disclosed embodiments are, however, not limited to these exemplary KYC or AML policies, and in other examples, the KYC or AML policies specified within policy data 272 may require any additional, or alternative, degree of partial correspondence between the respective data elements of verification data 268 and 270, including phonetic, semantic, or linguistic variations between the data elements of verification data 268 and 270.

Referring back to FIG. 2B, compliance module 266 may perform operations that apply the imposed KYC or AML policies corresponding elements of verification data 268 and 270, and based on the application of the imposed KYC or AML policies to the corresponding elements of verification data 268 and 270, compliance module 266 may determine whether the potential business customer, and as such, application request 110, comply with each of the imposed KYC or AML policies. For example, verification data 268 may specify, for the potential business customer, a corresponding business name (e.g., "ACME Inc."), a corresponding business address (e.g., "1234 Main Street, Washington, D.C., 20005), a corporate status of the potential business customer (e.g., "corporation"), and jurisdiction associated with that corporate status (e.g., "Delaware"). Further, and as described herein, the KYC or AML policies specified within policy data 272 may require that verification data 268 and 270 each specify a common business name, corporate status, and associated jurisdiction for the potential business customer, but may tolerate variations in a corresponding business address.

Based on the application of the imposed KYC or AML policies to the data elements of verification data 268 and 270, compliance module 266 may determine that each of business data 268 and verification data 270 specify a common business name (e.g., "ACME, Inc."), a common corporate status (e.g., a "C corporation"), and an associated jurisdiction (e.g., "Delaware") for the potential business customers. In some instances, and responsive to the determined correspondence between the business name, corporate status, and associated jurisdiction, compliance module 266 may establish that the potential business customer, and as such, application request 110, comply with the KYC or AML policies specified within policy data 272, and may generate data, e.g., compliance flag 274, indicative of the now-established compliance of the potential business customer and application request 110 with the KYC or AML policies imposed on or by the financial institution. Further, as illustrated in FIG. 2B, virtual machine 204 may perform operations that, either alone or in conjunction with executed RPA management engine 202, cause FI computing system 130 to associate compliance flag 274 with application request 110 and to store compliance flag 274 within a corresponding portions of compliance event queue 136, e.g., in conjunction with application request 110. The storage of compliance flag 274 within compliance event queue 136 in conjunction with application request 110 may, for example, "mark" application request 110 as being compliance with the imposed KYC or AML policies, e.g., for further intake and approval processing by the FI computing system.

In other examples, not illustrated in FIG. 2B, compliance module 266 may identify a discrepancy between one or more of the data elements within verification data 268 and corresponding data elements within verification data 270. For instance, while each of verification data 268 and 270 may specify that the potential business customer represents a "C corporation," compliance module 266 may determine that verification data 268 specifies that the potential business customer is incorporated in "Delaware," which verification data 270 specifies that the potential business customer is incorporated in "New York." Based on the discrepancy between the jurisdictions of incorporation specified within verification data 268 and 270, compliance module 266 may determine that the potential business customer, and application request 110, are not compliant with the KYC or AML policies specified within policy data 272, and may generate data, e.g., a non-compliance flag, indicative of the established non-compliance of the potential business customer and application request 110 with the KYC or AML policies imposed on or by the financial institution.

Further, although not illustrated in FIG. 2B, virtual machine 204 may perform operations that, either alone or in conjunction with executed RPA management engine 202, cause FI computing system 130 to associate the non-compliance flag with application request 110 and to store the non-compliance flag within a corresponding portions of compliance event queue 136, e.g., in conjunction with application request 110. The storage of the non-compliance flag within compliance event queue 136 in conjunction with application request 110 may, for example, "mark" application request 110 as being non-compliant with the imposed KYC or AML policies, which may trigger a performance of additional compliance operations by FI computing system 130. Examples of these additional compliance operations may include, but are not limited to, operations that generate and transmit a notification of the non-compliance to one or more computing systems or devices operable by a representative of the financial institution, which may prompt the representative to review application request 110 and obtain further information characterizing the non-compliant portions of application request 110, e.g., via telephone or other out-of-band communications channel.

Executed RPA management engine 202 may also generate one or more elements of session data 276, which may confirm the determined compliance (or alternatively, non-compliance) of the potential business customer, and application request 110, with the KYC or AML policies imposed on or by the financial institution. For example, session data 276 may include information that identifies the potential business customer (e.g., all or a selected portion of application request 110) and the outcome of the compliance processing (e.g., compliance flag 274, or a corresponding non-compliance flag), along with temporal or operational data that characterize the operation of executed programmatic bot 224 or virtual machine 204. In some instances, executed RPA management engine 202 may store the elements of session data 276 within a session log maintained within the one or more tangible, non-transitory memories of FI computing system 130, e.g., within session log 278.

In some instances, and through the implementation of the exemplary RPA-based processes and techniques described herein, FI computing system 140 may perform KYC or AML compliance processing for potential business customers and corresponding applications for financial services based not on interaction with an exposed programmatic interface associated with FI repository system 160 and third-party repository system 180, but instead based on virtualized interaction between programmatic software robots and a corresponding graphical user interface generated by application programs executed at each of FI repository system 160 and third-party repository system 180. Certain of these exemplary processes, which minimize an exposure of the programmatic interfaces of FI repository system 160 and third-party repository system 180 to the computing systems and devices operating with environment 100, may reduce a likelihood and/or an impacts of attacks by malicious third parties on FI repository system 160 and third-party repository system 180, and increase a security and confidentiality of the underlying elements of confidential data maintained at FI repository system 160 and third-party repository system 180. Moreover, certain of these exemplary processes, when implemented via software robots executed by virtual machines instantiated at FI computing system 140, may increase a security and confidentiality of the acquisition of the elements of data associated with potential business customers, while reducing an exposure of these acquired elements of customer data to additional computing systems and devices associated with or operated by the financial institution within environment 100.

Although not illustrated in FIG. 2B, and upon a successful application of the compliance processes described herein to the potential customer associated with application request 110, executed programmatic bot 224 to select an additional application request from allocated subset 242 of queued application requests, and may perform any of the exemplary processes described herein to establish a compliance of that additional application request, and the corresponding potential business customer, with the KYC or AML policies imposed on or by the financial institution (not illustrated in FIG. 2B). In some instances, executed programmatic bot 224 may perform one or more of these exemplary processes to establish a compliance of each additional, or alternate, one of allocated subset 242 of the prioritized application requests maintained within compliance event queue 136 (also not illustrated in FIG. 2).

Further, and as described herein, executed RPA management engine 202 may also perform operations that instantiate and/or clone one or more additional or alternate virtual machines executable by FI computing system 130 (not illustrated in FIG. 2), and that allocate an additional subset of the prioritized application requests maintained within compliance event queue 136 to each of these additional, or alternate, virtual machines. In some instances, each of these additional, or alternate, virtual machines may perform any of the exemplary, RPA-based processes described herein to establish a compliance of the application requests within respective ones of the allocated additional subsets, and of the corresponding potential business customers, with the KYC or AML policies imposed on or by the financial institution, and to generate and store data indicative of an outcome of these RPA-based compliance processes (e.g., a compliance or non-compliance flag) within compliance event queue 136 in conjunction with the corresponding one of the application requests.

Figure 3:
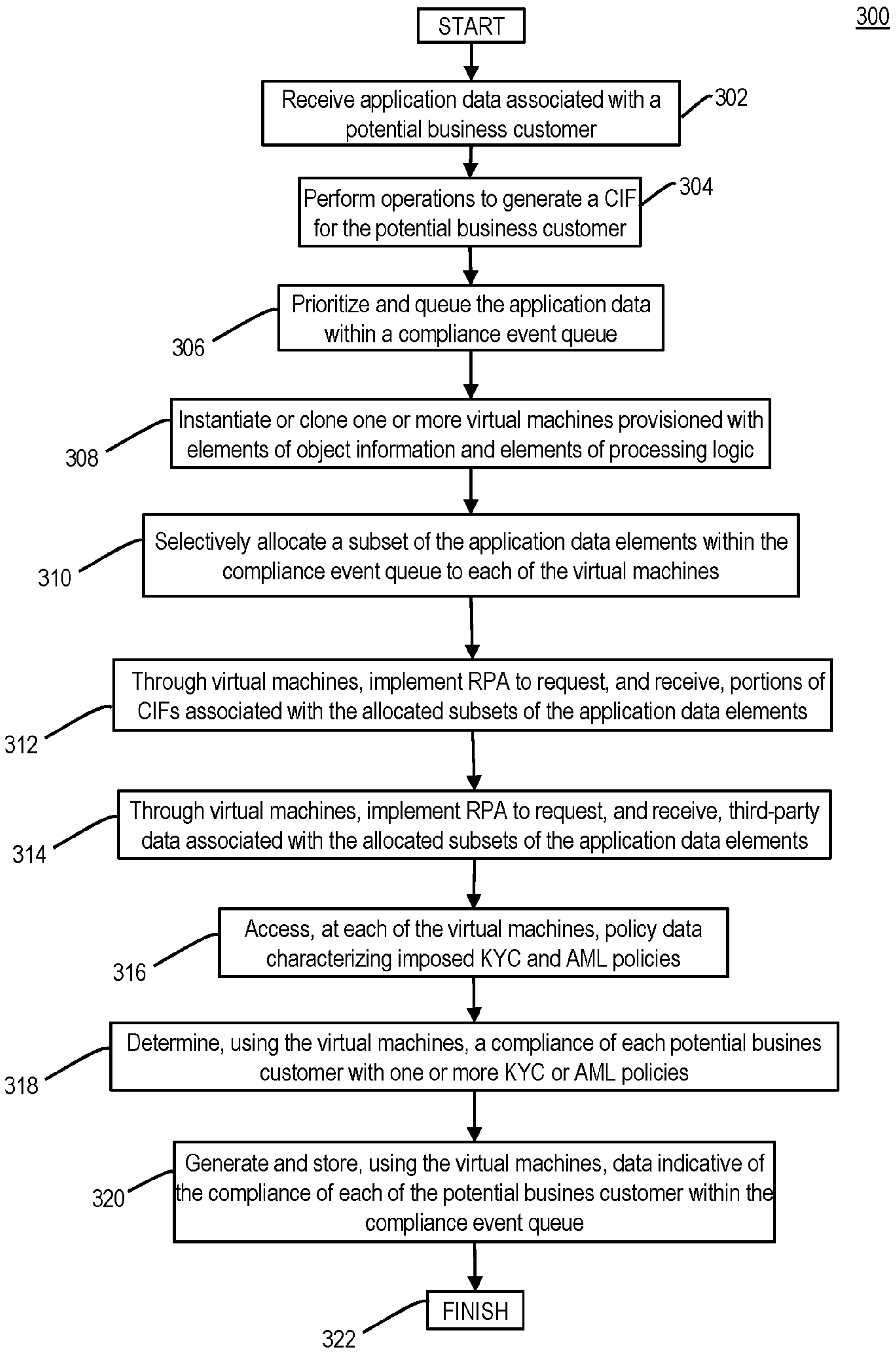
FIG. 3 is a flowchart of an exemplary process for managing queued compliance workflow using robotic process automation, in accordance with some exemplary embodiments.

FIG. 3 is a flowchart of an exemplary process 300 for managing queued compliance workflow using robotic process automation, in accordance with disclosed exemplary embodiments. For example, a network-connected computing system operating within environment 100, such as FI computing system 140, may perform one or more of the steps of exemplary process 300, which, among other things, include establishing a prioritized queue of compliance events associated with applications for financial services by potential business customers of a financial institution, instantiating one or more virtual machines and provisioning the one of more virtual machines with corresponding elements of object and action data and elements of processing logic, and through an execution of one or more programmatic software robots ("bots") by these virtual machines, implementing robotic process automation (RPA) techniques to request and receive elements of data characterizing the potential business customers and based on the data elements, determine whether each of the potential business customers comply with one or more know-your-customer (KYC) policies or anti-money-laundering (AML) policies imposed internally by the financial institution or by external regulators or governmental entities.

For example, referring to FIG. 3, FI computing system 130 may receive application data identifying and characterizing an application, by a potential business customer of a financial institution, to access one or more financial services offered by the financial institution (e.g., in step 302). As described herein, the application data may include, but is not limited to, a name of the potential business customer, a current address of the potential business customer, a corporate status of the potential business customer, a jurisdiction associated with that corporate status, and additional, or alternate, information characterizing the potential business customer, such as, but not limited to, a list of directors or managers of the potential business customer. In some instances, the received application data may be generated by an application program executed by a computing system or device operable by the potential business customer or a representative of the potential business customer (e.g., a mobile banking application, etc.), and the received application data may also include temporal data specifying a time or data associated with the potential business customer's application for the financial services.

FI computing system 130 may also perform any of the exemplary processes described herein to generate, and store, a customer interaction file (CIF) for the potential business customer (e.g., in step 304). By way of example, in step 304, FI computing system 30 my transmit all, or a selected portion, of the received application data across communications network 120 to one or more additional computing systems associated with the financial institution, such as FI repository system 160 of FIG. 1. As described herein, FI repository system 160 may perform operations that package the transmitted application data corresponding portions of a CIF for the potential business customer, and that store the generated CIF within a corresponding portion of a locally maintained data repository, such as CIF data store 162 of FIG. 1.

Further, FI computing system 130 may also access a compliance event queue, and perform any of the exemplary processes described herein to prioritize the received application data among the one or more queued elements of application data maintained within compliant event queue, and to modify the compliance event queue to include the received application data at a corresponding position within queued elements of application data (e.g., in step 306). FI computing system 130 may also perform any of the exemplary processes described herein to instantiate one or more virtual machines provisioned with elements of object information and elements of processing logic, and additionally, or alternatively, to clone one or more previously instantiated and provisioned virtual machines (e.g., in step 308). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects.

Referring back to FIG. 3, FI computing system 130 may perform any of the exemplary processes described herein to selectively allocate, to each of the instantiated or cloned virtual machines, a subset of the application data elements maintained within the compliance event queue (e.g., in step 310). Further, and upon execution by FI computing system 140, the one or more programmatic bots established by each of the instantiated or cloned virtual machines may implement any of the exemplary RPA-based techniques described herein (e.g., in accordance with the provisioned elements of processing logic) to: (i) request, and receive, portions of customer information files (CIFs) that identify and characterize the potential business customers associated with the allocated subsets of the queued application data elements (e.g., in step 312); and (ii) request, and receive, elements of third-party verification data identifying and characterizing the potential business customers (e.g., in step 314).

For example, in step 312, the elements of processing logic provisioned to each of the virtual machines may encode sequential operations that, when performed by the one or more programmatic bots established by each of the virtual machines, cause respective ones of the executable objects to access a GUI or digital portal generated and presented by an application program executed at FI repository system 160, and to request and receive, via the accessed GUIs or digital portals, portions of the CIFs associated with each of the potential business customer associated with each of the application data elements within the corresponding allocated subset from CIF data store 162. Further, in step 314, the elements of processing logic provisioned to each of the virtual machines may encode additional sequential operations that, when performed by the one or more programmatic bots, cause respective ones of the executable objects to access a GUI or digital portal generated and presented by an application program executed at third-party repository system 180, and to request and receive, via the accessed GUIs or digital portals, elements of third-party verification data associated with each of the potential business customers from third-party data store 182. As described herein, the portions of the CIFs and the elements of third-party verification data associated with each of the potential business customers may include, but are not limited to, a corresponding business name, a corresponding business address, a corresponding corporate status, a jurisdiction associated with that corresponding corporate status, and additional, or alternate, elements of information associated with the potential business customer, such as a list of managers or directors.

In further examples, and upon execution by FI computing system 130, the one or more programmatic bots established by each of the virtual machines may access elements of policy data characterizing each of the KYC or AML policies imposed on the potential business customers by the financial institution (e.g., in step 316), and may perform operations that establish a compliance, or a non-compliance, of the potential business customers associated with the allocated subsets of the queued application data elements with the imposed KYC or AML policies based on the received portions of the CIFs and the third-party verification data (e.g., in step 318).

Further, and upon execution by FI computing system 130, the one or more programmatic bots established by each of the virtual machines may also perform any of the exemplary processes described herein to generate data, e.g., a flag, indicative of the established compliance or non-compliance of the potential business customers with the imposed KYC or AML policies, to store the generated data, e.g., the compliance or non-compliance flag, within the compliance event queue in conjunction with corresponding ones of the queued application data elements (e.g., in step 320). Exemplary process 300 is then complete in step 322.

B. Exemplary Processes Virtualized Testing and De-Risking Programmatic Interfaces Using Robotic Process Automation FIGS. 4A-4C and 5A-5B illustrate additional components of exemplary computing environment 100, which perform computerized processes that, through a virtualization of robotic process automation (RPA) techniques, generate discrete elements of input data consumable by a programmatic interface having a particular target state and technical blueprint, and that characterize and test a functionality, operation, reliability, and security of the programmatic interface based on elements of output data generated by the programmatic interface in response to corresponding ones of the input data elements, in accordance with some exemplary implementations. As described herein, the testing and monitoring of the functionality, operation, reliability, and security of programmatic interface may represent integral, enterprise-management operations performed by many organizations, including a financial institution, to not only ensure a robust and secure programmatic exchange of data between network-connected computing devices and systems operating within a computing environment of the organization, but also to facilitate a deployment of newly established or modified programmatic interfaces within the computing environment.

For example, to establish, or to maintain reliably, an interoperability of programmatic interfaces, including application programming interfaces (APIs), that facilitate programmatic communication between various computing systems and devices, a financial institution may regularly test the functionality and security of the software libraries (e.g., elements of executable code, configuration data, etc.) that collectively establish each of these programmatic interfaces within a corresponding computing environment. Further, prior to deployment of any additional software library within an existing programmatic interface, or prior to the deployment of a new programmatic interface within the computing environment, the financial institution may perform additional, and extensive, testing to ensure that the modified or new programmatic interface performs in an "expected" manner based on a consumptions of data in various volumes, at various frequencies, and of having various compositions or formats.

The continuous API testing, or "de-risking," implemented by the financial institution often represents a time-intensive, manual endeavor (especially when coupled with the effort required to generate and deploy the new or modified programmatic interface), and in some instances, a scope of many conventional mechanisms for testing programmatic interfaces may be limited by temporal and data-specific constraints imposed by the associated human interaction. Further, although certain automatic processes may exist to testing programmatic interfaces, many of these automated testing processes nonetheless rely on human interaction to establish the scope and sequentially of the automated testing, and lack any functionality to dynamically and adaptively modify the testing protocol, much less the underlying component software libraries of the new or modified programmatic interfaces, in response to data characterizing a real-time outcome of the testing process.

Certain of the exemplary processes described herein may virtualize and automate one or more processes for testing and de-risking programmatic interfaces having particular target states and technical blueprints through an instantiation of one or more virtual machines at a computing system of the financial institution (e.g., FI computing system 130), and through an implementation, by each of the virtual machines, of robotic process automation (RPA) techniques that mimic a programmatic interaction between computing systems and these programmatic interfaces and additionally, or alternatively, a functionality of these programmatic interfaces. By way of example, and as described herein, these RPA techniques, when implemented by each of the virtual machines, may enable each of these virtual machines to execute one or more software robots (e.g., "bots") that generate discrete elements of input data having varied structures and compositions, which may be consumed by a target programmatic interface at varied frequencies, and that receive corresponding elements of output data generated by the target programmatic interface in response to the consumed input data elements, and further, that generate elements of session data characterizing the structure and composition of each element of input data and including the corresponding element of output data generated through the consumption of that input data element by the programmatic interface.

Through an analysis of the session data generated by each of the executed programmatic bots, certain of the exemplary processes described herein may enable one or more application programs executed computing system of the financial institution to assess a consistency between the generated output generated during the testing process and an "expected" output or behavior of the target programmatic interface, and to "de-risk," in real-time, a candidate design of a new programmatic interface, or a candidate modification to an existing programmatic interface. Based on the determined consistency, or the lack thereof, certain of these exemplary processes may also dynamically or adaptively modify the operation of one or more of programmatic bots (e.g., by modifying the underlying process logic) and additionally, or alternatively, that dynamically or adaptively modify one or more elements of code that establish the target programmatic interface. Thus, certain of these exemplary processes, which virtualize and automate one or more processes for testing and de-risking programmatic interfaces having particular target states and technical blueprints, can be implemented in addition to, or as an alternate to, conventional testing and de-risking processes that rely on a manual interventions by representatives of the financial institution to establish or modify a technical blueprint of a target programmatic interface based on a comparison of actual and expected behavior.

Further, certain of the exemplary processes described herein may also virtualize an implementation of a target programmatic interface through an instantiation of virtual machines that, when executed by the computing system of the financial institution, mimic operations performed by respective candidate implementations of the target programmatic interface. As described herein, each of the candidate implementations of the target programmatic interface may be characterized by a corresponding candidate technical blueprint and corresponding set of candidate functionalities, and a structure and composition of the consumable input data may vary across the candidate implementations of the target programmatic interface. The virtualized implementation of the target programmatic interface may, in some examples, facilitate the testing, de-risking, and adaptive modification of each of the candidate implementations, and based on an outcome of these exemplary processes, a developer of the target programmatic interface may select, and build-out the target programmatic interface in accordance with corresponding ones of the candidate implementations that minimize, or eliminate, deviations from the expected behavior of the target programmatic interface. As such, certain of these exemplary processes, which virtualize the implementation of a target programmatic interface across multiple instantiated virtual machines, can be implemented in addition to, or as an alternate to, conventional processes that test and de-risk candidate implementations of the target programmatic interface based on sequential sets of manual intervention and analysis.

Figure 4A:
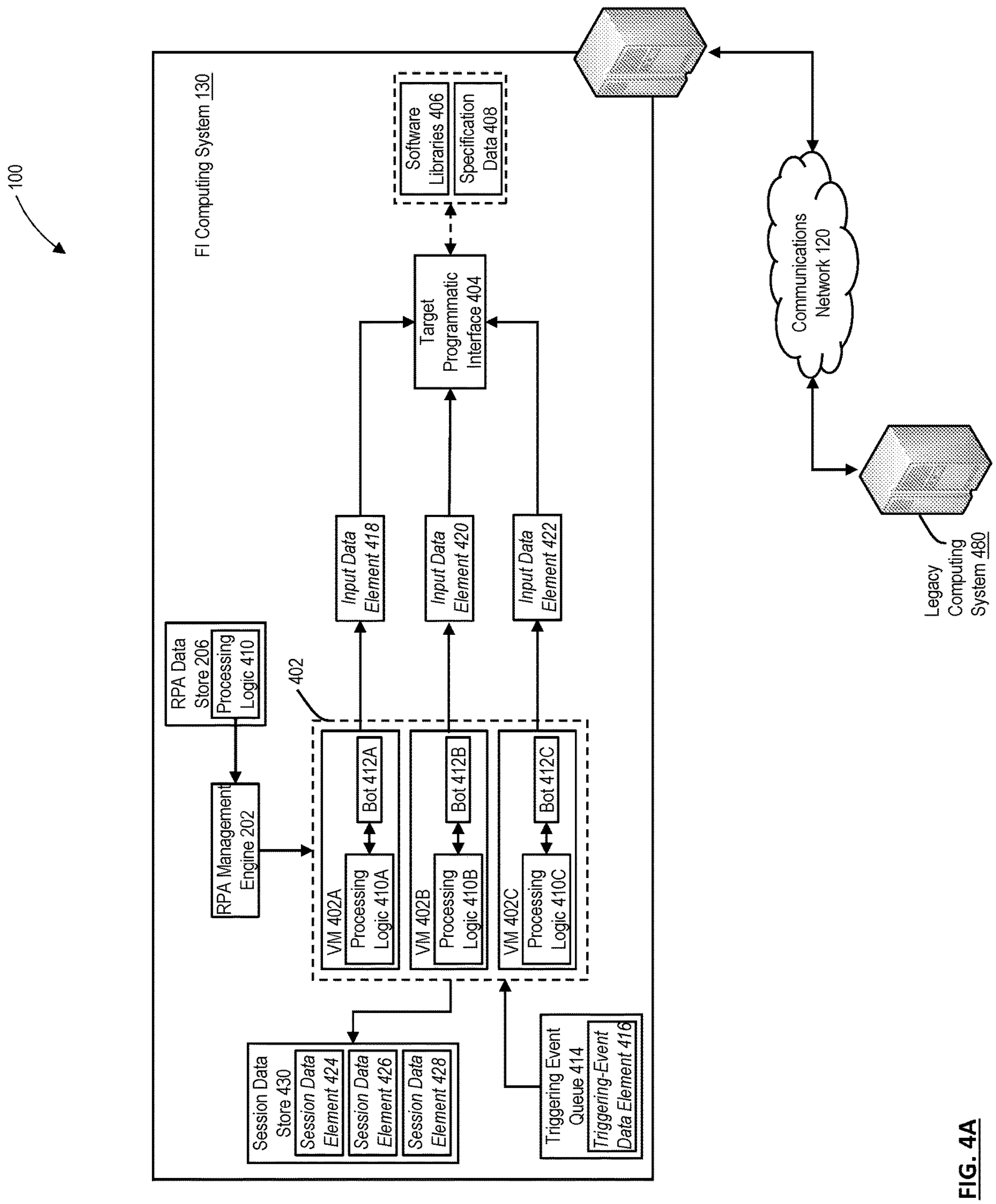
FIGS. 4A, 4B, 4C, 5A, 5B, and 5C are block diagrams illustrating portions of an exemplary computing environment, in accordance with some exemplary embodiments.

Referring to FIG. 4A, the one or more processors of FI computing system 130 may execute an RPA management engine 202, which may perform operations that instantiate (or clone) a plurality of virtual machines at FI computing system 130, such as virtual machines 402 that include, but are not limited to, virtual machine 402A, 402B, and 402C. In some instances, executed RPA management engine 202 may perform operations that instantiate each of virtual machines 402A, 402B, and 402C, and additionally, or alternatively, may perform operations that instantiate virtual machine 402A and that clone virtual machines 402B and 402C from one or more previously instantiated virtual machines, such as virtual machine 402A. In other instances, not illustrated in FIG. 4A, executed RPA management engine 202 may perform operations that instantiate and/or clone any additional, or alternate, number of virtual machines executing at FI computing system 130, including a single one of virtual machines 402. In some examples, each of virtual machines 402, including virtual machines 402A, 402B, and 402C, may execute one or more programmatic software robots (e.g., programmatic "bots"), and the executed programmatic bots may be configured by elements of processing logic to generate discrete elements of input for publication to, and consumption by, a target programmatic interface 404, e.g., in accordance with specified elements of process logic.

In some instances, target programmatic interface 404 may interconnect a legacy computing system 480 that operate within environment 100 with one or more application programs executed by FI computing system 130 and additional, or alternatively, with applications programs other computing systems operating within environment 100 that are associated with the financial institution or with unrelated third-parties (not illustrated in FIG. 4A). For example, legacy computing system 480 may maintain, within one or more tangible, non-transitory memories, one or more elements of confidential profile, account, or transaction data characterizing current and prior customers of the financial institution, and target programmatic interface 404 may include, but is not limited to, an application programming interface (API) that enables one or more computing systems of the financial institution, such as FI computing system 130, or one or more computing systems associated with unrelated third parties, to interact programmatically with legacy computing system 480 and to request, and receive, elements of the confidential customer profile, account, or transaction data locally maintained at legacy computing system.

Target programmatic interface 404 may be associated with or established by one or more software libraries, e.g., shown generally as software libraries 406, that collectively establish and facilitate permitted interactions between legacy computing system 480 and the one or more computing systems of the financial institution or of the unrelated third parties that operate within environment 100, e.g., via corresponding executed application programs. In some instances, software libraries 406 may include elements of executable code, subroutines, and class, value, or type specifications, along with configuration data and elements of documentation or help data that collectively establish one or more implementations of target programmatic interface 404. Each of the one or more implementations may, for example, correspond to a particular target functionality, or a particular combination of target functionalities, of target programmatic interface 404 that facilitate specific types of interactions between legacy computing system 480 and the one or more computing systems of the financial institution or of the unrelated third parties, such as, but not limited, queries to access certain locally maintained elements of the confidential customer profile, account, or transaction data, requests to save locally additional elements of the confidential customer profile, account, or transaction data, and/or requests to modify or delete certain locally maintained elements of the confidential customer profile, account, or transaction data.

The one or more target functionalities and as such, the one or more implementations of target programmatic interface 404 may each be associated with elements of input data having a specified composition and/or structure. Further, upon processing input data having that the specified composition or structure associated with a particular functionality or implementation, target programmatic interface 404 may be configured (e.g., by software libraries 406) to perform operations and generate corresponding elements of output data consistent with the particular functionality or implementation, e.g., in accordance with an "expected" behavior that produces an "expected" outcome. In some examples, target programmatic interface 404 may also be associated with one or more elements of specification data, shown generally as specification data 408, that identify and characterize the structure or composition of the set of input data elements associated with each of the particular functionalities or implementations of target programmatic interface 404 and further, that identify and characterize an expected output or behavior associated with each of these implementation.

For example, a particular functionality (and as such, an associated implementation) of target programmatic interface 404 may include, but are not limited to, the processing of requests to access and obtained elements of the confidential customer profile, account, or transaction data maintained locally by legacy computing system 480. In some instances, the elements of specification data 408 associated with that particular functionality (e.g., the processing of requests to access and obtain locally maintained data) may specify a composition of a corresponding request (e.g., an identifier of a requesting application program, an identifier of the particular functionality, an identifier of a requested data element or elements, etc.), along with a structure of not only the request (e.g., an ordering of the constituent identifiers with the request, alphanumeric or character delimiters, etc.), but also a structure or size of each constituent data element (e.g., a format or number of characters, a maximum byte size, leading or trailing zeroes, etc.). Further, the elements of specification data 408 associated with that particular functionality may also identify and characterize an expected behavior or output of target programmatic interface 404, such as, but not limited to, an identifier of an expected data element or a format or structure of the expected data element (e.g., tokenized data, etc.)

By way of example, target programmatic interface 404 may represent a proof-of-concept subject to integration with legacy computing system 480 in conjunction with one or more additional computing systems associated with the financial institution (e.g., FI computing system 130) or unrelated third parties within environment 100. Further, based on the elements of specification data 408, FI computing system 130 may identify and characterize the functionalities and input requirements of the target programmatic interface 404, and FI computing system 130 may perform any of the exemplary RPA-based processes described herein to analyze and model what target programmatic interface 404 considers "expected behavior, at least in a proof-of-concept form. Additionally, once built-out and integrated with legacy computing system 480 and one or more additional computing systems associated with the financial institution or the unrelated third parties, all or a selected portion of elements of specification data 408 may be transmitted to, or "exposed" to, each of these computing systems to facilitate programmatic interactions and exchanges of data via target programmatic interface 404.

In some instances, target programmatic interface 404 may be established through one or more virtual machines instantiated at FI computing system 130. The one or more virtual machines may, for example, be configured to access (e.g., read or write access) a corresponding portion of the one or more tangible, non-transitory memories of FI computing system, and software libraries 406 and the elements of specification data 408 may be maintained within the accessing portion of the one or more tangible, non-transitory memories. In other instances, consistent with the disclosed exemplary embodiments, target programmatic interface 404 may be established as a container-based application within the one or more tangible, non-transitory memories of FI computing system 130, and software libraries 406 and the elements of specification data 408 may be maintained within the portion of the one or more tangible, non-transitory memories associated with the corresponding containers. The disclosed embodiments are, however, not limited to these implementations of target programmatic interface 404, and in other examples, FI computing system 130 may establish target programmatic interface 404 using any additional or alternate virtualized or programmatic implementation, including implementations on additional computing systems (e.g., distributed computing systems) accessible to FI computing system 130 across one or more communications networks.

Referring back to FIG. 4A, each of virtual machines 402, including virtual machines 402A, 402B, and 402C, may execute one or more programmatic bots may be configured by the elements of processing logic to generate discrete elements of input for publication to, and consumption by, a target programmatic interface 404, e.g., in accordance with specified elements of processing logic. For example, each of virtual machines 402A, 402B, and 402C may execute a respective one of programmatic bots 412A, 412B, and 412C, and each of executed programmatic bots 412A, 412B, and 412C may include, and may be established by, one or more corresponding executable objects (not illustrated in FIG. 4A), which may be generated by virtual machines 402A, 402B, and 402C using any of the exemplary processes described herein. In some instances, each of executed programmatic bots 412A, 412B, and 412C may configured by the elements of the processing logic to may mimic a functionality of one or more application programs executed at FI computing system 130 in accessing target programmatic interface 404 based on input data having a corresponding composition and structure.

By way of example, executed RPA management engine 202 may perform operations that access RPA data store 206, and that provision one or more elements of processing logic 410 to each of virtual machines 402, including virtual machines 402A, 402B, and 402C. As illustrated in FIG. 4A, executed RPA management engine 202 may provision element 410A of processing logic 410 to virtual machine 402A, may provision element 410B of processing logic 410 to virtual machine 402B, and may also provision element 410C of processing logic 410 to virtual machine 402B. In some instances, based on the provisioned elements 410A, 410B, and 410C of processing logic, and on a detected occurrence of a triggering event, one or more of executed programmatic bots 412A, 412B, and 412C may perform operations that dynamically vary the composition or structure of the generated input data to test the functionality, reliability, and security of the target programmatic interface 404.

As illustrated in FIG. 4A, each of executed programmatic bots 412A, 412B, and 412C may be configured by corresponding ones of processing logic elements 410A, 410B, and 410C to monitor and interact with elements of data characterizing one or more triggering events, within may be maintained within a triggering event queue 414 (e.g., within a portion of the one or more tangible, non-transitory memories of FI computing system 130). The elements of triggering event data maintained within triggering event queue 414 may be prioritized and ordered in accordance with a time or date of receipt at FI computing system 130, in accordance with a corresponding source of the triggering event data, or in accordance with any additional or alternate property of characteristic of the elements of triggering event data. In some examples, and upon processing by corresponding ones of executed programmatic bots 412A, 412B, and 412B, each of the elements of triggering event data maintained within triggering event queue 414 may cause corresponding ones of executed programmatic bots 412A, 412B, and 412B to generate an element of structured, triggering-event-specific input data capable of consumption by target programmatic interface 404, e.g., in accordance with corresponding elements 410A, 410B, and 410C of processing logic.

The one or more triggering events may include, but are not limited to, a receipt of an email or electronic message associated with a request to access, obtain, or modify the elements of confidential customer profile, account, or transaction data maintained at legacy computing system 480, or a detection of an element of confidential customer profile, account, or transaction data missing from a data record of a database or data repository maintained by FI computing system 130, e.g., a database address associated with a "null" value. Further, and by way of example, the triggering event data associated with the received email or electronic message may include all, or a selected portion, of that email or electronic message, and the triggering event data associated with the missing data element may include, but is not limited to, the corresponding database address associated with the null value and an identifier of the missing data element. In some instances, not illustrated in FIG. 4A, FI computing system 130 may perform operations (e.g., "push" or "pull" operations) and obtain programmatically the elements of triggering event data from one or more application programs executed at FI computing system 130 or both other computing systems or devices associated with the financial institution and operations within environment 100, such as, but not limited to, one or more email applications that establish or manage corresponding email inboxes, or one or more database-management applications that manage elements of data maintained within corresponding databases or data repositories.

For example, the elements of triggering event data maintained within triggering event queue 414 may include data element 416, which identifies missing customer address within a data record of a customer relationship management (CRM) database maintained at FI computing system 130. As described herein, data element 416 may include, among other things, an identifier of the missing data element (e.g., an identifier of the customer address), an address of the corresponding data record within the CRM database, and information that identifies a CRM application that maintains the CRM database. The disclosed embodiments are, however, not limited to exemplary data element 416, and in other instances, triggering event queue 414 may be populated with any additional or alternate elements of triggering event data accessible to FI computing system 130 and associated with requests for the elements of confidential customer profile, account, or transaction data maintained at legacy computing system 480.

In some instances, executed RPA management engine 202 may perform operations that monitor triggering event queue 414 and detect an element of triggering event data newly queued into, and populated within, triggering event queue 414, such as, but not limited to, data element 416. Upon detection of data element 416 within triggering event queue 414, executed RPA management engine 202 may perform additional operations that allocate data element 416 to each of executed virtual machines 402, including virtual machines 402A, 402B, and 402C. Further, and as described herein, each of executed programmatic bots 412A, 412B, and 412C may process data element 416 and perform operations that, consistent with respective ones of elements 410A, 410B, and 410C of processing logic, generate respective, event-specific elements of input data consumable by target programmatic interface 404. In some instances, the structure or composition of the each of the generated elements of input data may be specified by respective ones of elements 410A, 410B, and 410C of processing logic and further, may be consistent with the triggering event associated with data element 416, e.g., the detected absence of the customer address within the CRM database. Further, and as described herein, the elements of input data may be generated by corresponding ones of executed programmatic bots 412A, 412B, and 412B in order to elicit a corresponding, and "expected," response from target programmatic interface 404 and further, to test the functionality, reliability, and security of the target programmatic interface 404.

For example, element 410A of processing logic may encode operations that, when performed by executed programmatic bot 412A, cause executed programmatic bot 412A to generate an element 418 of output data that requests the customer address identified within data element 416 and missing from the CRM database. In some instances, and as described herein, input data element 418 may include, but is not limited to, an identifier of the requested element of confidential customer data (e.g., the requested customer address), the address of the corresponding data record within the CRM database, and an identifier of executed programmatic bot 412A. Further, and as described herein, a composition and a structure of input data element 418 may the consistent with an expected composition of structure of requests for elements of confidential customer data consumed by target programmatic interface 404 (e.g., as defined by specification data 408 and as specified within element 410A of processing logic), and as such, an expected response to input data element 418 (e.g., as generated by target programmatic interface 404), may include, among other things, the requested customer address.

Further, element 410B of processing logic may encode operations that, when performed by executed programmatic bot 412B, cause executed programmatic bot 412B to generate an element 420 of input data that requests the customer address identified within data element 416 and missing from the CRM database. Additionally, and as illustrated in FIG. 4A, element 410C of processing logic may encode operations that, when performed by executed programmatic bot 412C, cause executed programmatic bot 412C to generate an element 422 of input data that requests the customer address identified within data element 416 and missing from the CRM database. In some instances, a composition of structure of each of input data element 420 and input data element 422 may, in accordance with respective ones of elements 410B and 410C of processing logic, represent a deviation from the expected composition or structure of requests for elements of confidential customer data consumed by target programmatic interface 404 (e.g., as defined by specification data 408 and as specified within element 410A of processing logic).

For instance, and consistent with the sequential operations encoded within element 410B of processing logic, the composition of input data element 420 may be consistent with the expected composition of the requests for elements of confidential customer data consumed by target programmatic interface 404, but the structure of one or more portions of input data element 420 may be inconsistent with the expected structure of such consumable requests. By way of example, although input data element 418 may include the expected identifier of the requested customer address, the expected address of the corresponding data record, and the expected identifier of executed programmatic bot 412B, a structure of the identifier of the requested customer address may be inconsistent with the structure of that identifier expected at target programmatic interface, e.g., a number of characters associated with the identifier of the requested customer address within input data element 420 may exceed an expected number or range of number of characters, or may include one or more impermissible characters, such as punctuation. As such, an expected response to input data element 420, as generated by target programmatic interface 404, may include not the requested customer address, but instead an error message indicative of the structural inconsistencies within input data element 420.

In other instances, and consistent with the sequential operations encoded within element 410C of processing logic, the composition of input data element 422 may be inconsistent with an expected composition of the requests for elements of confidential customer data consumed by target programmatic interface 404. For example, input data element 422 may omit the identifier of executed programmatic bot 412C, or alternatively, may include a null value in place of the expected identifier of executed programmatic bot 412C. As such, an expected response to input data element 422, as generated by target programmatic interface 404, may include not the requested customer address, but instead an error message indicative of the compositional inconsistencies within input data element 422. Further, the disclosed embodiments are not limited to these exemplary deviations from an expected composition or structure of input data elements 420 and 422, and in other examples, consistent with the sequential operations encoded within corresponding ones of elements 410A, 410B, and 410C of processing logic, input data elements 418, 420, and 422 may include any additional, or alternate, deviation from an expected composition, an expected structure, or any combination thereof that facilitates the testing, de-risking, and adaptively modification of target programmatic interface 404 using the exemplary processes described herein.

Referring to FIG. 4A, each of executed programmatic bots 412A, 412B, and 412C may be configured by corresponding ones of elements 410A, 410B, and 410C of processing logic to publish input data elements 418, 420, and 422 to an input stream of target programmatic interface 404, e.g., for consumption and further processing. In some instances, a timing at which each of executed programmatic bots 412A, 412B, and 412C provides respective ones of input data elements 418, 420, and 422 to target programmatic interface 404 may be defined by elements 410A, 410B, and 410C of processing logic and may be tailored to further test an operation of functionality of target programmatic interface 404 when receiving input data at a predetermined frequency or at a predetermined volume.

Further, in some examples, each of executed programmatic bots 412A, 412B, and 412C (e.g., in accordance with respective ones of elements 410A, 410B, and 410C of processing logic) may perform operations that generate, respectively, elements 424, 426, and 428 of session data. For instance, each of session data elements 424, 426, and 426 may identify and characterize a structure and composition of a corresponding one of input data elements 418, 420, and 422 and further, an expected response to the corresponding ones of input data elements 418, 420, and 422. Each of session data elements 424, 426, and 426 may also include temporal data that identifies a time or date at which each of these session data elements were generated, respectively, by executed programmatic bots 412A, 412B, and 412C. As illustrated in FIG. 4A, each of executed programmatic bots 412A, 412B, and 412C may perform additional operations that store respective ones of session data elements 424, 426, and 428 within a portion of the one or more tangible, non-transitory memories of FI computing system 130, e.g., within structured or unstructured data records of session data store 430.

Figure 4B:
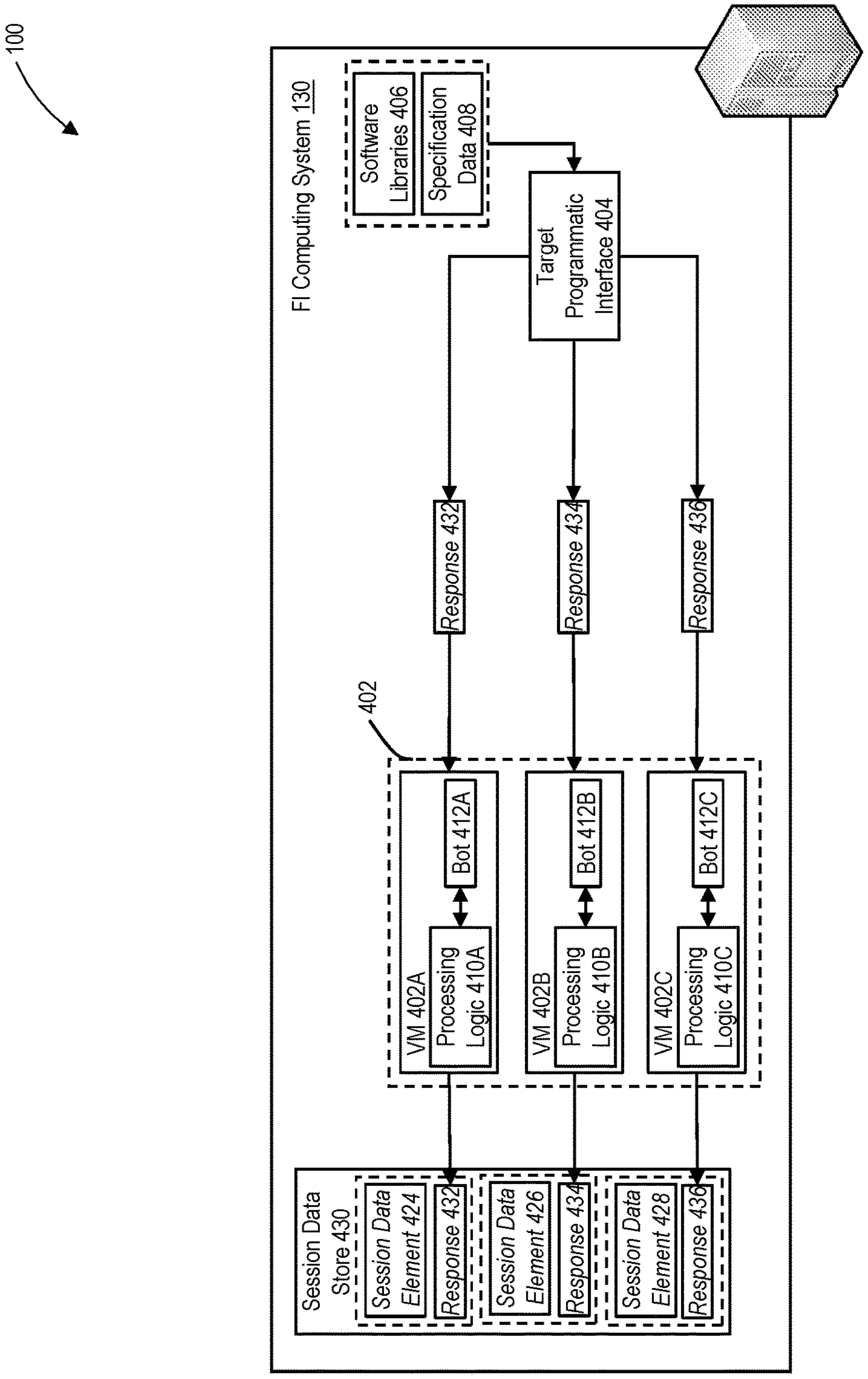

Referring to FIG. 4B, target programmatic interface 404 may receive each of input data elements 418, 420, and 422 (e.g., as published by respective ones of executed programmatic bots 412A, 412B, and 412C). In some instances, target programmatic interface 404 may perform operations consistent with software libraries 406 to confirm whether a structure and composition of each of input data elements 418, 420, and 422 is consistent with an expected structure and composition of an underlying request, inquiry, or query associated with each of input data elements 418, 420, and 422 (e.g., the expected structure and composition of the request for the confidential data maintained at legacy computing system 480, as indicated by specification data 408).

For example, input data element 418 may include the identifier of the requested customer address, the address of the corresponding data record, and the identifier of executed programmatic bot 412A, and target programmatic interface 404 may perform operations to determine, in accordance with software libraries 406 and based on specification data 408, that input data element 418 represents a request to access and obtain elements of confidential customer data maintained at legacy computing system 480 (e.g., the customer address), and further, that both the structure and composition of input data element 418 are consistent with an expected structure and composition of such requests. In some instances, and based on the identifier of the requested customer address, target programmatic interface 404 may perform operations that, in conjunction with one or more additional application programs or module executed by FI computing system 130 (not illustrated in FIG. 4B), access the requested customer address (e.g., from one or more of legacy computing system 480 and additionally, or alternatively, from a local testing data store that mimics a file structure and composition of one or more data repositories of confidential customer data maintained by legacy computing system 480), and package the requested customer address into portion of a response 432 to input data element 418, along with a corresponding time stamp. Further, as illustrated in FIG. 4B, target programmatic interface 404 may provision response 432 to executed virtual machine 402A, e.g., for processing by executed programmatic bot 412A in accordance with element 410A of processing logic.

Further, and in accordance with in accordance with software libraries 406 and based on specification data 408, target programmatic interface may determine that: (i) a structure of one or more constituent components of input data element 420 (e.g., the identifier of the requested customer address, as described herein) is inconsistent with the expected structure of a request to access and obtain the elements of confidential customer data maintained at legacy computing system 480; and (ii) a composition of input data element 422 (e.g., the omission of the identifier of executed programmatic bot 412C, as described herein) is inconsistent the expected composition of such as request. Target programmatic interface 404 may also perform operations that, in conjunction with one or more additional application programs or module executed by FI computing system 130 (not illustrated in FIG. 4B), generate a response 434 to input data element 420, and a response 436 to input data element 422. In some instances, response 434 may include an error message indicative of the determined structural inconsistency associated with input data element 420, and response 436 may include an additional error message indicative of the determined compositional inconsistency associated with input data element 422. As illustrated in FIG. 4B, target programmatic interface 404 may provision responses 434 and 436 to respective ones of executed virtual machines 402B and 404C, e.g., for processing by respective ones of executed programmatic bot 412B in accordance with element 410B of processing logic and executed programmatic bot 412C in accordance with element 410C of processing logic.

In some instances, each of virtual machines 402A, 402B, and 402C may receive a respective one of responses 432, 434, and 436, which may be processed by a corresponding one of executed programmatic bots 412A, 412B, and 412C and stored within corresponding portions of session data store 430. For example, as illustrated in FIG. 4B, each of responses 432, 434, and 436 may be stored within session data store 430 in conjunction with a corresponding one of session data elements 424, 426, and 428, which identify and characterize a structure and composition of a corresponding one of input data elements 418, 420, and 422 and further, an expected response to the corresponding ones of input data elements 418, 420, and 422 by target programmatic interface 404. In other examples, not illustrated in FIG. 4B, target programmatic interface 404 may also perform operations that, in conjunction with one or more additional application programs or module executed by FI computing system 130 (not illustrated in FIG. 4B), store responses 432, 434, and 436 in conjunction with corresponding ones of session data elements 424, 426, and 428 within session data store 430, e.g., in addition to, or as an alternative to, transmitting responses 432, 434, and 436 to virtual machines 402A, 402B, and 402C.

Figure 4C:
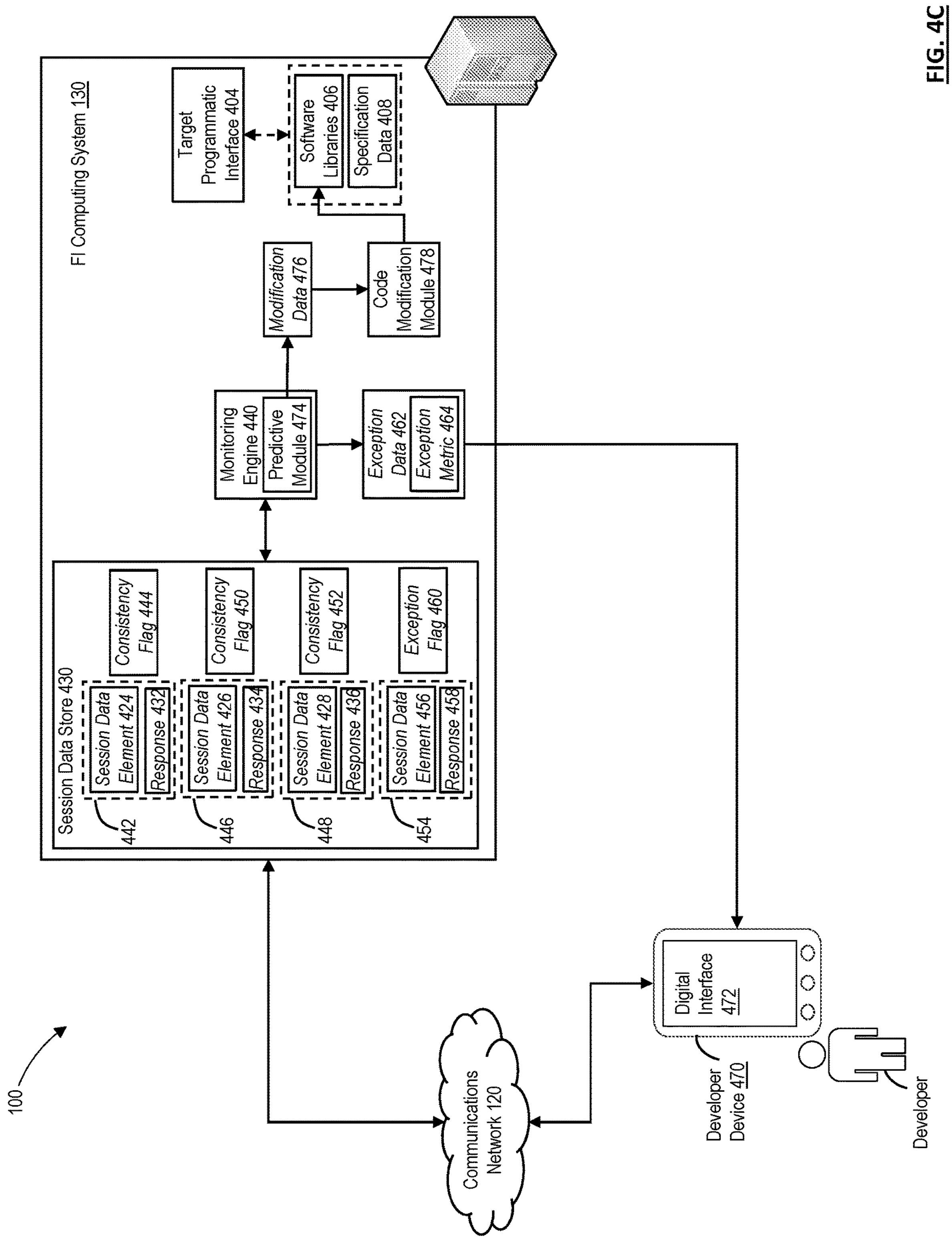

Referring to FIG. 4C, a monitoring engine 440 executed by the one or more processors of FI computing system 130 may perform operations that access session data store 430, and for each associated pair of responses and session data elements, determine whether the corresponding response includes or represents an "expected" behavior or response by target programmatic interface 404 (e.g., in view of the structure and composition of the input data elements specified within the corresponding session data elements). For example, executed monitoring engine 440 may access an element pair 442 that includes response 432 and session data element 424, which identifies and characterizes the structure and composition of input data element 418 and the expected response to the input data element 418 by target programmatic interface 404. As described herein, the expected response to input data element 418 by target programmatic interface 404 may include the requested customer address, and executed monitoring engine 440 may parse response 432 to detect the presence of the requested customer address and further, to determine that the behavior of target programmatic interface 404 when consuming input data element 418 is consistent with the expected behavior associated with input data element 418. Based on the determined consistency, executed monitoring engine 440 may generate data indicative of the determined consistency, e.g., consistency flag 444, and store consistency flag 444 in a portion of session data store 430 associated with element pair 442.

Further, executed monitoring engine 440 may also access, within session data store 430, element pair 446, which includes response 434 and session data element 426, and element pair 448, which includes response 436 and session data element 428. As described herein, session data element 426 identifies and characterizes the structure and composition of input data element 420 and the expected response to the input data element 420 by target programmatic interface 404 (e.g., an error due to a structural inconsistency in input data element 420), and session data element 428 identifies and characterizes the structure and composition of input data element 422 and the expected response to the input data element 422 by target programmatic interface 404 (e.g., an error due to a compositional inconsistency in input data element 422). In some instances, executed monitoring engine 440 may parse responses 434 and 436 to detect the presence of the expected error message, and as such, may determine that the behavior of target programmatic interface 404 when consuming input data elements 420 and 422 is consistent with the expected behavior associated with the composition and structure of input data elements 420 and 422. Based on the determined consistency, executed monitoring engine 440 may generate data indicative of the determined consistency, e.g., consistency flags 450 and 452, and store consistency flags 450 and 452 in a portions of session data store 430 associated with respective ones of element pair 446 and 448.

In other examples, and based on an analysis of additional, or alternate, paired responses and session data elements within session data store 430, executed monitoring engine may determine that one or more of the stored responses represent a deviation from the expected behavior of target programmatic interface 404. These deviations may, for example, include a determination the one or more responses include unexpected or improperly formatted data, include an unexpected error message, fail to include and expected element of data maintained by legacy computing system 480, or fail to include an expected error message. For example, executed monitoring engine 440 may access, within session data store 430, element data pair 454 that an additional element 456 of session data (e.g., that identifies and characterizes the structure and composition of an additional input data element generated by one of executed programmatic bots 412A, 412B, or 412C using any of the exemplary processes described herein, and an expected response to that additional input data element by target programmatic interface 404), and an additional, actual response 458 of target programmatic interface 404 to the additional input data element.

For instance, the additional input data element may be generated by executed programmatic bot 412B, and may correspond to a request for one or more elements of the confidential customer account data maintained at legacy data system 170. Further, session data element 456 may establish that the expected outcome of the additional input data element includes the requested elements of confidential customer account data, as the additional input data includes neither structural or compositions inconsistencies. In some examples, and based on a comparison of the session data element 456 and response 458, executed monitoring engine 440 may establish that the actual response to the additional input data element generated by target programmatic interface 404, e.g., response 458, includes an error message indicative of a structural inconsistency associated with the additional input data element and as such, may determine that the actual response of target programmatic interface 404 to the additional input data element deviates from the expected response.

Based on the deviation between the actual and expected responses of target programmatic interface 404 to the additional input data element, executed monitoring engine 440 may determine that the behavior of target programmatic interface 404 represents an exception, and may generate data indicative of the determined exception, e.g., exception flag 460, which executed monitoring engine 440 may store within a corresponding portion of session data store 430, e.g., in conjunction with element data pair 454. Further, executed monitoring engine 440 may repeat these exemplary processes for each additional or alternate element data pair maintained within session data store 430, and may generate and store, for each additional or alternate element data pair within data session data store 430, a consistency flag indicative of a determined consistency between the actual and expected behavior of target programmatic interface 404, or an exception flag indicative of a determined deviation between the actual and expected behavior of target programmatic interface 404 e.g., at predetermined intervals or continuously in real time.

Further, in some examples, executed monitoring engine 440 may further parse session data store 430 to identify each element data pair associated with a corresponding exception flag, including element data pair 454, and to package each element data pair and corresponding exception flag within a portion of exception data 462. Additionally, executed monitoring engine 440 may perform additional operations that generate an exception metric 464 indicative of an incidence of the determined exceptions among the paired elements of session data and responses maintained within session data store 430, and as such, the determined instances of deviations between the actual and expected behavior of target programmatic interface 404 during interactions with executed programmatic bots 412A, 412B, and 412C, e.g., at predetermined intervals or continuously in real time. In some instances, exception metric 464 may include a numerical value indicative of a portion of the stored pairs of session data elements and corresponding responses associated with an exception flag (e.g., a percentage value ranging from zero to one hundred, a fractional value ranging from zero to unity), and executed monitoring engine make package exception metric 464 into a corresponding portion of exception data 462.

Executed monitoring engine 440 may perform operations that cause FI computing system 130 to transmit exception data 462, including exception metric 464, across communications network 120 to one or more devices or computing systems associated with a developer of target programmatic interface 404, e.g., developer device 470. In some instances, not illustrated in FIG. 4C, one or more applications executed by developer device 470 may receive and process exception data 462, and may perform operations and render all, or a selected portion, of exception data 462, including exception metric 464, to the developer within a corresponding digital interface 472. Based on the presented portions of exception data 462, including exception metric 464, the developer may elect to modify elements of processing logic 410 of one or more of executed programmatic bots 412A, 412B, and 412C (e.g., elements 410, 410B, or 410C of processing logic), or may elect to modify certain portions of software libraries 406, which collectively target programmatic interface 404 (e.g., elements of executable code, configuration data, etc.), to mitigate future occurrences of the determined deviations and exceptions (also not illustrated in FIG. 4C).

Further, in some examples, executed monitoring engine 440 may, via one or more programmatically generated commands, executed a predictive module 474 that accesses exception data 462, including exception metric 464, and may perform operations that apply one or more trained machine learning or artificial intelligence models or processes to structured input data that includes all, or a selected subset of exception data 462, including exception metric 464. Examples of the trained machine learning and artificial intelligence models include, but are not limited to, an artificial neural network model, a supervised learning model, such as a decision tree algorithm or a random forest algorithm, an unsupervised learning model, a support vector machine (SVM) algorithm, or one or more deep-learning algorithms or models.

Based on the application of the one or more trained machine learning or artificial intelligence models or algorithms to the input data (e.g., that includes exception data 462 and exception metric 464), executed prediction module 474 may identify one or more candidate modifications to software libraries 406 that, if implemented, may reduce a future likelihood of deviations from the expected behavior of target programmatic interface 404. For example, as illustrated in FIG. 4C, executed predictive module 474 may package information identifying each of the candidate modifications within a corresponding portion of modification data 476, which executed predictive module 474 may provide as an input to a code modification engine 478 executed by the one or more processors of FI computing system 130.

In some instances, executed code modification engine 478 may receive modification data 476, which identifies and characterizes each of the identified candidate modifications to software libraries 406 that establish target programmatic interface 404, and may perform operations that modify or alter selected portions of software libraries 406 in accordance with modification data 476, e.g., to effect or implement the identified candidate modifications within software libraries 406. As described herein, through the implementation of the identified candidate modifications within software libraries 406, certain of the exemplary processes described herein may dynamically and adaptively modify the operations or functionalities of target programmatic interface 404, thus reducing the likelihood of future deviations between the expected and actual behavior of target programmatic interface 404. Further, one or more of exception data 462, exception metric 464, and modification data 476 may be accessed by executed prediction module 474 and packaged into additional elements of training data (e.g., not illustrated in FIG. 4C), with which executed predictive module 474 may further train, and adaptively improve, the machine learning or artificial intelligence processes described herein.

Further, certain of the exemplary RPA-based testing and monitoring processes may be iteratively repeated until a generated value of exception metric 464 (e.g., as generated by executed monitoring engine 440 using any of the exemplary processes described herein) falls below a predetermined threshold value. Based on a determination that the repetitively or iteratively generated value of exception metric 464 falls below the predetermined threshold value, certain of the exemplary processes described herein may deem target programmatic interface de-risked and ready for integration with application programs executed by legacy computing system 480 and the one or more additional computing systems associated with the financial institution or the unrelated third parties, all or a selected portion of elements of specification data 408 (e.g., as generated based on repetitive or iterative modifications to software libraries 406) may be transmitted to, or "exposed" to, each of these computing systems to facilitate programmatic interactions and exchanges of data via target programmatic interface 404.

In some instances, FI computing system 130 may implement one or more of the exemplary robotic process automatic (RPA) techniques described herein that, through the programmatic generation of data consumable a target programmatic interface having particular target state and technical blueprint, characterize the functionality, operation, and security of that target programmatic interface and as such, facilitate an integration of the target programmatic interface one or more computing systems operating within environment 100, such as, but not limited to, legacy computing system 480. Further, and as described herein, target programmatic interface 404 may be associated with various implementations and corresponding functionalities that, when integrated into, legacy computing system 480 and exposed to the one or more additional computing systems within environment 100, facilitate various interactions between these additional computing systems and legacy computing system 480. Examples of these functionalities and interactions may include, but are not limited to, queries by the additional computing systems to access certain locally maintained elements of the confidential data, requests by the additional computing systems to save locally additional elements of confidential data, and/or requests to modify or delete certain locally maintained elements of the confidential data.

Although a developer of target programmatic interface 404 may understand and fully characterize the functionalities of target programmatic interface 404 that facilitate interactions between legacy computing system 480 and additional computing systems within environment 100, the developer may identify a number of candidate technical blueprints, and corresponding configurations of software libraries 406, capable of implementing these functionalities. Further, due to the complexity of these candidate technical blueprints, or due to temporal or financial limitations associated with the deployment and integration of target programmatic interface 404, the developer may be ill-positioned to finalize the technical blueprint and the configuration of software libraries 406 without additional testing and de-risking of each of the candidate technical blueprints.

In some instances, FI computing system 130 may repeatedly perform any of the exemplary RPA-based processes described herein to test the functionality, reliability, and security of a candidate programmatic interface established in accordance with candidate configuration of software libraries 406 and as such, reflecting each candidate technical blueprint for target programmatic interface. In other instances, describe below in reference to FIGS. 5A, 5B, and 5C, FI computing system 130 may perform additional operations that generate a virtualized implementation of target programmatic interface 404 based on an instantiation (or cloning) of one or more additional virtual machines that, collectively or individually, mimic the functionality of corresponding candidate configurations of software libraries 406 and as such, that reflect corresponding ones of the candidate technical blueprints of target programmatic interface 404. The virtual implementation of the target programmatic interface 404 may facilitate the testing, de-risking, and adaptive modification of each of the candidate configuration, and based on an outcome of these exemplary processes, the developer of the target programmatic interface 404 may select, and build-out target programmatic interface 404 in accordance with corresponding ones of the candidate configurations that minimize, or eliminate, deviations from the expected behavior of target programmatic interface 404.

Figure 5A:
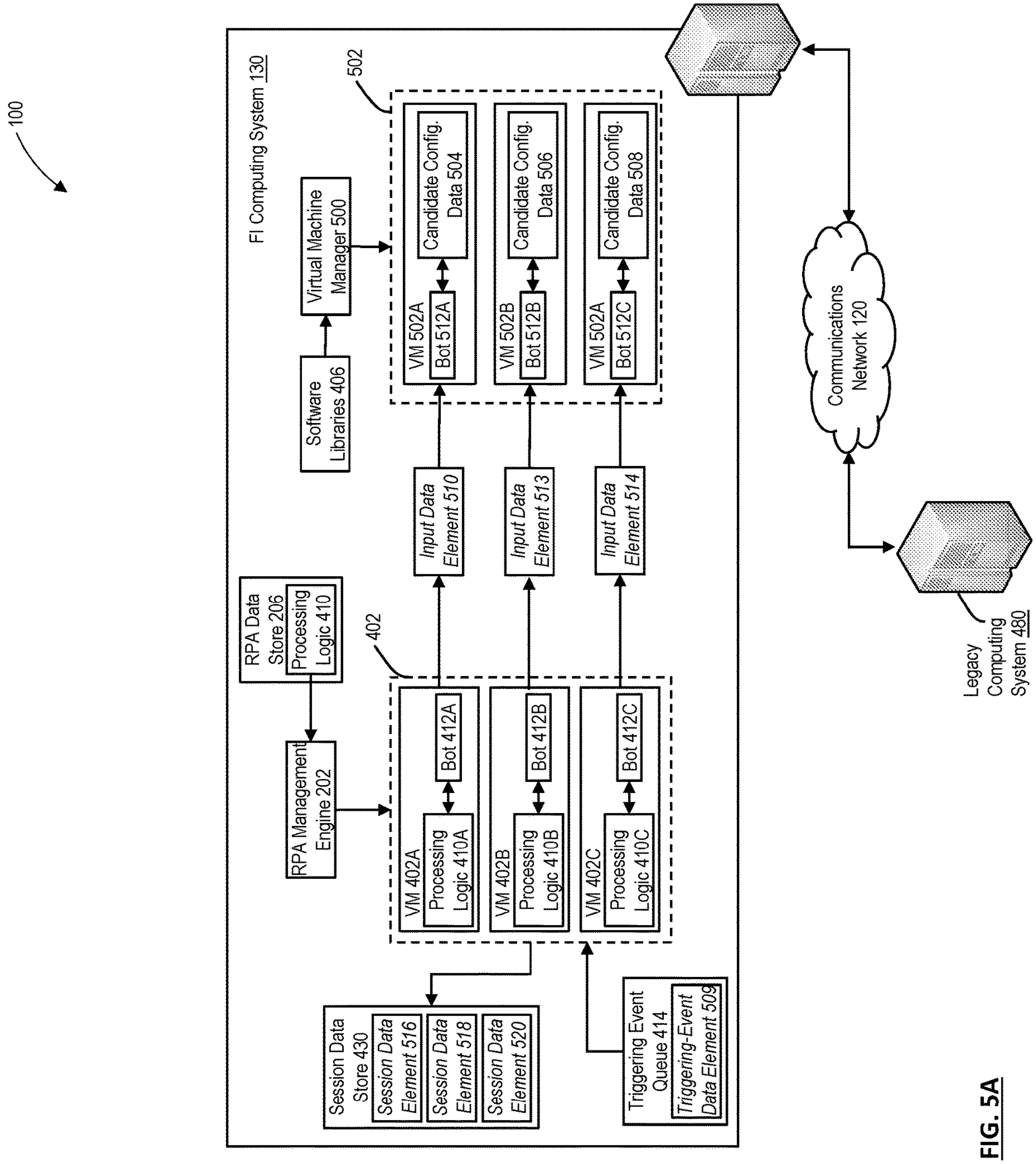

Referring to FIG. 5A, the one or more processors of FI computing system 130 may execute one or more applications, such as a virtual machine manager 500, and executed virtual machine manager 500 may perform operations that instantiate (or clone) a plurality of additional virtual machines 502 at FI computing system 130, such as, but are not limited to, virtual machine 502A, 502B and 502C. In some instances, executed RPA management engine 202 may perform operations that instantiate each of virtual machines 502A, 502B, and 502C, and additionally, or alternatively, may perform operations that instantiate virtual machine 502A and that clone virtual machines 502B and 502C from one or more previously instantiated virtual machines, such as virtual machine 502A. In other instances, not illustrated in FIG. 5A, executed virtual machine manager 500 may perform operations that instantiate and/or clone any additional, or alternate, number of additional virtual machines executing at FI computing system 130, including a single one of virtual machines 402.

Each of virtual machines 502, including virtual machines 502A, 502B, and 502C, may execute one or more programmatic software robots (e.g., programmatic "bots"), and each of the executed programmatic bots may be configured by elements of processing logic to mimic a functionality of a candidate configuration of software libraries 406, and further, to perform operations consistent with a corresponding candidate technical blueprint of a target programmatic interface, such as target programmatic interface 404. As described herein, target programmatic interface 404 may represent a proof-of-concept subject to integration with legacy computing system 480 in conjunction with one or more additional computing systems associated with the financial institution (e.g., FI computing system 130) or unrelated third parties within environment 100. Further, target programmatic interface 404 may be associated with one or more particular functionalities, or particular combinations of functionalities, that, upon integration, facilitate particular interactions between legacy computing system 480 and the one or more computing systems of the financial institution or of the unrelated third parties.

In some instances, these particular functionalities, or particular combinations of functionalities, of target programmatic interface 404 may be associated with, or may result from a plurality of candidate configurations of software libraries 406, and as such, a plurality of candidate technical blueprints for target programmatic interface 404. Further, each of these candidate configurations of software libraries 406, and the candidate technical blueprints, may be associated with a common set of specification data characterizing a structure or composition of the set of input data elements for the candidate configurations (e.g., specification data 408, as described herein). Additionally, or alternatively, one or more of these candidate configurations of software libraries 406, and the candidate technical blueprints, may be associated with a configuration-specification data, and as such, a configuration-specific set of input data elements and corresponding expected outputs or behaviors.

Referring back to FIG. 5A, executed virtual machine manager 500 may perform operations that access software library 406, and that provision an element of candidate configuration data to each of virtual machines 502, including virtual machines 502A, 502B, and 502C. For instance, executed virtual machine manager 500 may provision candidate configuration data 504 to virtual machine 502A, may provision candidate configuration data 506 to virtual machine 502B, and may also provision candidate configuration data 508 to virtual machine 502C. Further, in some examples, each of virtual machines 502A, 502B, and 502C may execute a respective one of programmatic bots 512A, 512B, and 512C, and each of executed programmatic bots 512A, 512B, and 512C may include, and may be established by, one or more corresponding executable objects (not illustrated in FIG. 5A), which may be generated by virtual machines 502A, 502B, and 502C using any of the exemplary processes described herein.

In some examples, each of executed programmatic bots 512A, 512B, and 512C may perform operations consistent with respective ones of candidate configuration data 504, 506, and 508 that consume elements of input data and mimic the functionality of corresponding candidate configurations, and corresponding candidate technical blueprints, of target programmatic interface 404. Further, an through an implementation of one or more of the exemplary RPA-based testing and de-risking processes described herein, FI computing system 130 may identify a corresponding one of the candidate configurations of software libraries 406, and as such, a corresponding one of the candidate technical blueprints, of target programmatic interface 404 that reduces or minimizes a future likelihood of deviations from the expected behavior of target programmatic interface 404 (e.g., an "optimal" one of the candidate configurations of software libraries 406).

Referring back to FIG. 5A, executed RPA management engine 202 may perform any of the exemplary processes described herein to monitor triggering event queue 414 and detect an element of triggering event data newly queued into, and populated within, triggering event queue 414, such as, but not limited to, data element 509. Upon detection of data element 509 within triggering event queue 414, executed RPA management engine 202 may perform additional of the exemplary processes described herein to allocate data element 509 to each of executed virtual machines 402, including virtual machines 402A, 402B, and 402C. Further, and as described herein, each of executed programmatic bots 412A, 412B, and 412C may process processing logic 410 and perform operations that, consistent with respective ones of elements 410A, 410B, and 410C of processing logic, generate respective, event-specific elements of input data consumable by the candidate configurations of target programmatic interface 404 implemented by each of virtual machines 502A, 502B, and 502C.

In some instances, the structure or composition of the each of the generated elements of input data may be specified by respective ones of elements 410A, 410B, and 410C of processing logic and further, may be consistent with the triggering event associated with data element 509, e.g., the detected absence of the customer address within the CRM database. Further, and as described herein, the elements of input data may be generated by corresponding ones of executed programmatic bots 412A, 412B, and 412B in order to elicit a corresponding, and "expected," response from each of the candidate configurations of target programmatic interface 404 and further, to test the functionality, reliability, and security of the each of the candidate configurations target programmatic interface 404, and to identify a corresponding one of the candidate configurations, and as such, a corresponding one of the candidate technical blueprint, of target programmatic interface 404 that reduces or minimizes a future likelihood of deviations from the expected behavior of target programmatic interface 404.

For example, element 410A of processing logic may encode operations that, when performed by executed programmatic bot 412A, cause executed programmatic bot 412A to generate an element 510 of output data that requests the customer address identified within data element 509 and missing from the CRM database. Further, as illustrated in FIG. 5A, executed programmatic bot 412A may be configured by element 410A of processing logic to publish input data elements 510 to an input stream of virtual machine 502A, e.g., for consumption and further processing by executed programmatic bot 512A in accordance with candidate configuration data 504.

As described herein, input data element 510 may include, but is not limited to, an identifier of the requested element of confidential customer data (e.g., the requested customer address), the address of the corresponding data record within the CRM database, and an identifier of executed programmatic bot 412A. Further, and as described herein, a composition and a structure of input data element 510 may be consistent with an expected composition of structure of requests for elements of confidential customer data consumed by the candidate configuration of target programmatic interface 404 implemented by virtual machine 502A (e.g., as defined by corresponding specification data and as specified within element 410A of processing logic), and as such, an expected response to input data element 510 (e.g., as generated by executed programmatic bot 512A of virtual machine 502A), may include, among other things, the requested customer address.

Further, element 410B of processing logic may encode operations that, when performed by executed programmatic bot 412B, cause executed programmatic bot 412B to generate an element 513 of input data that requests the customer address identified within data element 510 and missing from the CRM database. Further, element 410C of processing logic may encode operations that, when performed by executed programmatic bot 412C, cause executed programmatic bot 412C to generate an element 514 of input data that requests the customer address identified within data element 510 and missing from the CRM database. As illustrated in FIG. 5A, executed programmatic bot 412B may be configured to publish input data element 513 to an input stream of virtual machine 502B (e.g., for consumption and further processing by executed programmatic bot 512B in accordance with candidate configuration data 506), and executed programmatic bot 412C may be configured to publish input data element 514 to an input stream of virtual machine 502C (e.g., for consumption and further processing by executed programmatic bot 512C in accordance with candidate configuration data 508).

In some instances, a composition and a structure of input data elements 513 and 514 may be consistent with an expected composition of structure of requests for elements of confidential customer data consumed by the candidate configurations of target programmatic interface 404 implemented by respective ones of virtual machine 502B and 502C (e.g., as defined by corresponding specification data and as specified within respective elements 410B and 410C of processing logic). As such, expected responses to input data elements 513 and 514 (e.g., as generated by respective ones of executed programmatic bot 512B of virtual machine 502B and of executed programmatic bot 512C of virtual machine 502C), may include, among other things, the requested customer address.

Further, in some examples, each of executed programmatic bots 412A, 412B, and 412C (e.g., in accordance with respective ones of elements 410A, 410B, and 410C of processing logic) may perform operations that generate, respectively, elements 516, 518, and 520 of session data. For instance, each of session data elements 516, 518, and 520 may identify and characterize a structure and composition of a corresponding one of input data elements 510, 513, and 514 and further, an expected response to the corresponding ones of input data elements 510, 513, and 514. Each of session data elements 516, 518, and 520 may also include temporal data that identifies a time or date at which each of these session data elements were generated, respectively, by executed programmatic bots 412A, 412B, and 412C. As illustrated in FIG. 5A, each of executed programmatic bots 412A, 412B, and 412C may perform additional operations that store respective ones of session data elements 516, 518, and 520 within a portion of the one or more tangible, non-transitory memories of FI computing system 130, e.g., within structured or unstructured data records of session data store 430.

Figure 5B:
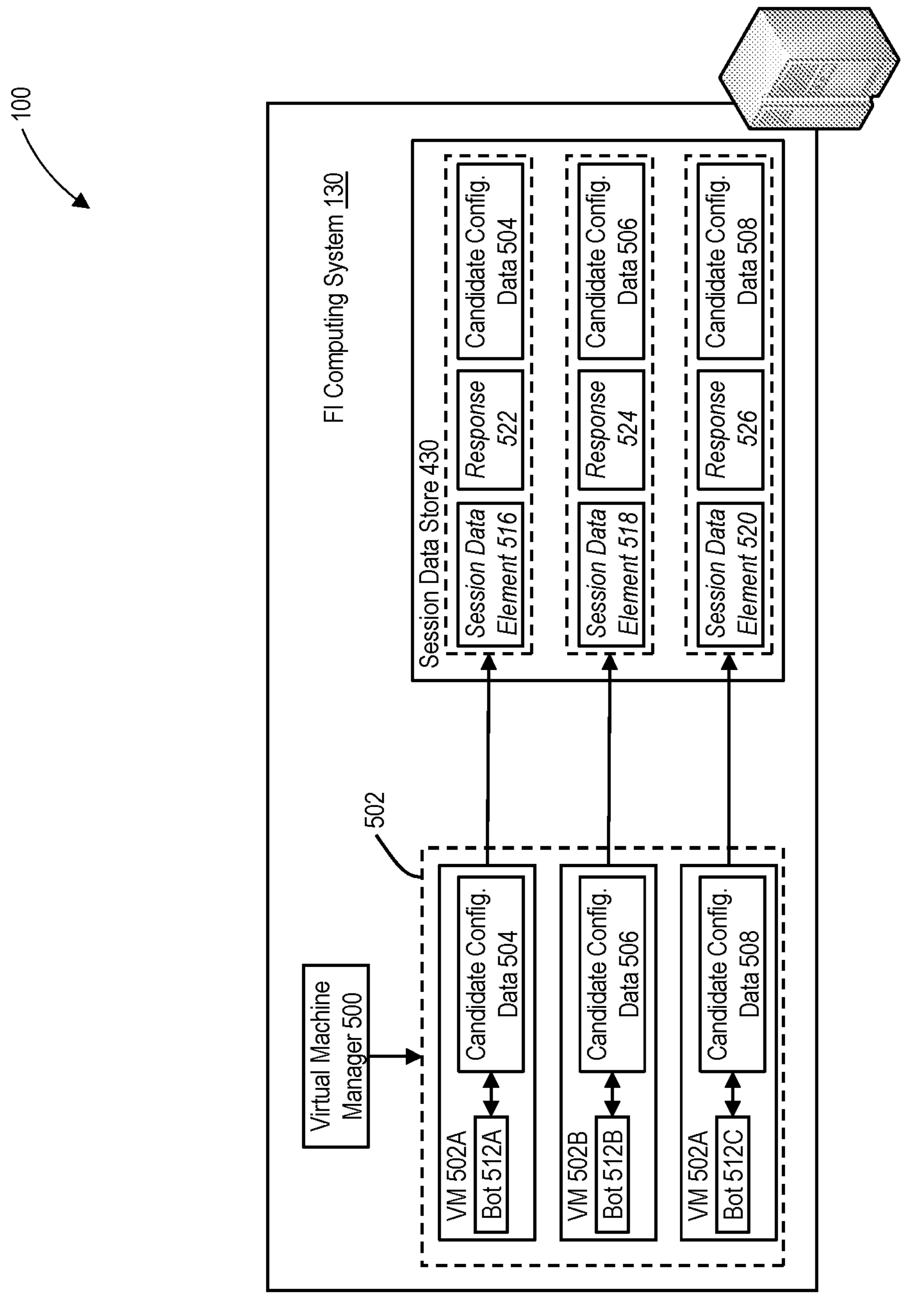

Referring to FIG. 5B, each of virtual machines 502A, 502B and 502C may receive a corresponding ones of input data elements 510, 513, and 514 (e.g., as published by respective ones of executed programmatic bots 412A, 412B, and 412C). In some instances, executed programmatic bot 512A may perform operations consistent with candidate configuration data 504 to confirm whether a structure and composition of input data elements 510 is consistent with an expected structure and composition of an underlying request, inquiry, or query associated with input data elements 510. For example, input data element 510 may include an identifier of the requested customer address, an address of the corresponding data record, and an identifier of executed programmatic bot 412A, and target programmatic interface 404 may perform operations to determine, in accordance with candidate configuration data 504, that input data element 510 represents a request to access and obtain elements of confidential customer data maintained at legacy computing system 480 (e.g., the customer address), and further, that both the structure and composition of input data element 510 are consistent with an expected structure and composition of such requests.

Based on the identifier of the requested customer address, executed programmatic bot 512A may perform operations that, in conjunction with one or more additional application programs or module executed by FI computing system 130 (not illustrated in FIG. 5B), access the requested customer address (e.g., from one or more of legacy computing system 480 and additionally, or alternatively, from a local testing data store that mimics a file structure and composition of one or more data repositories of confidential customer data maintained by legacy computing system 480), and package the requested customer address into portion of a response 522 to input data element 510, along with a corresponding time stamp. Further, as illustrated in FIG. 5B, executed programmatic bot 512A may perform operations that store response 522 and in some instances, candidate configuration data 504, within session data store 430 in conjunction with session data element 516, which identifies and characterizes a structure and composition of a corresponding input data element 510 and further, an expected response to input data element 510. Further, executed programmatic bot 512A may also provision response 522 to executed virtual machine 402A, e.g., for processing by executed programmatic bot 412A in accordance with element 410A of processing logic.

Executed programmatic bots 512B and 512C may also perform any of the exemplary processes described herein, consistent with respective ones of candidate configuration data 506 and 508, to determine whether a structure and composition of corresponding ones of input data elements 513 and 514 is consistent with an expected structure and composition, and based on the determination, to generate responses 524 and 526 to the corresponding ones of input data elements 513 and 514. For example, executed programmatic bot 512B may perform operations that store response 524 and in some instances, candidate configuration data 506, within session data store 430 in conjunction with session data element 518, which identifies and characterizes a structure and composition of a corresponding input data element 513 and further, an expected response to input data element 513. Further, as illustrated in FIG. 5B, executed programmatic bot 512C may perform operations that store response 526 and in some instances, candidate configuration data 508, within session data store 430 in conjunction with session data element 520, which identifies and characterizes a structure and composition of a corresponding input data element 514 and further, an expected response to input data element 514. In some instances, executed programmatic bots 512B and 512C may also provision responses 524 and 526 to executed virtual machines 402B and 402C, e.g., for processing by executed respective ones of programmatic bots 412B and 412C in accordance with corresponding elements 410B and 410C of processing logic.

Figure 5C:
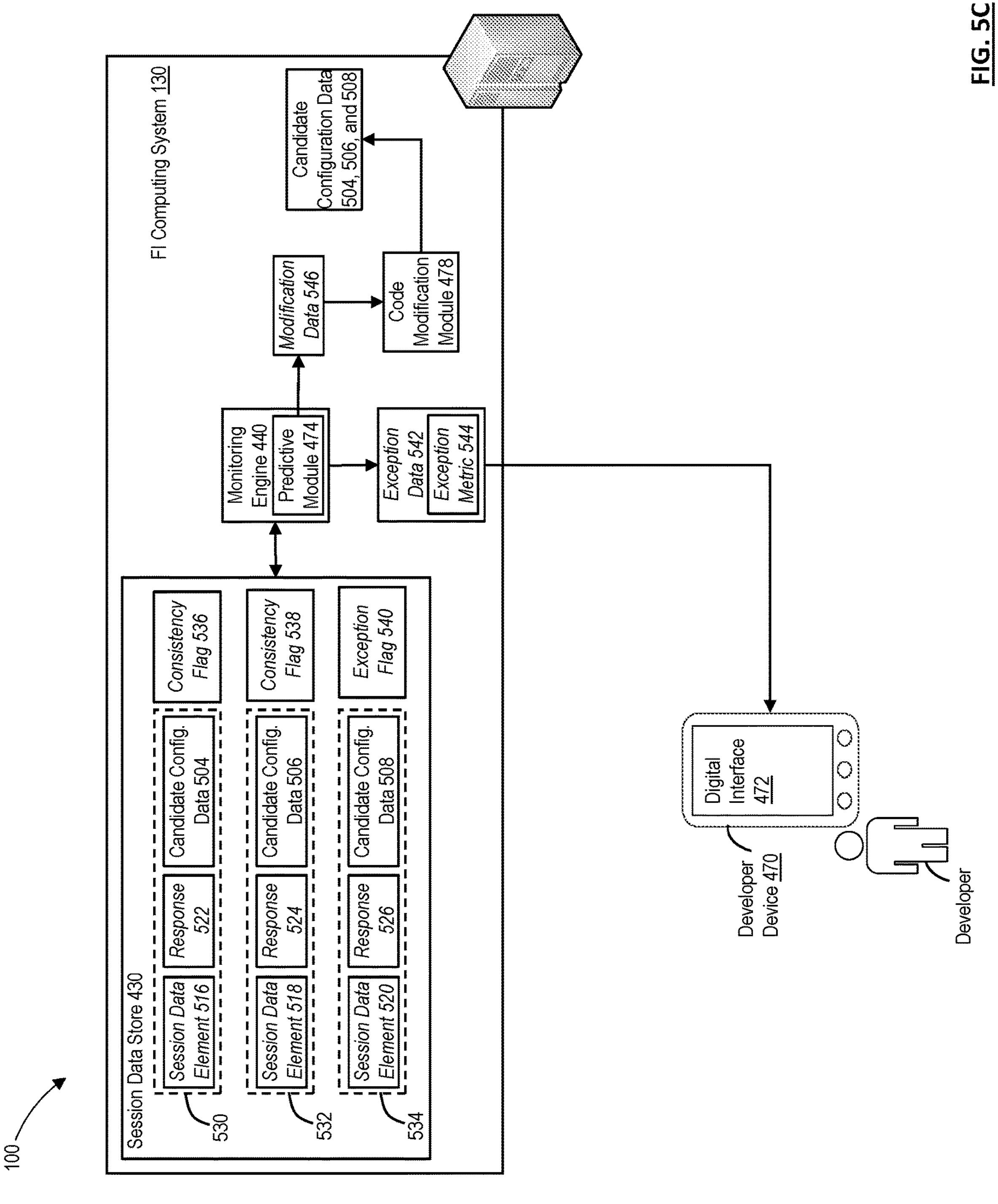

Referring to FIG. 5C, executed monitoring engine 440 may access session data store 430, and for each associated group of responses, session data elements, and candidate configuration data, executed monitoring engine 440 may perform any of the exemplary processes described herein to determine whether the corresponding response includes or represents an "expected" behavior or response associated with each of the candidate configurations of target programmatic interface 404 (e.g., as implemented by executed programmatic bots 512A, 512B, and 512C in accordance with corresponding ones of candidate configuration data 504, 506, and 508). For example, executed monitoring engine 440 may access group 530, which includes session data element 516, response 522, and candidate configuration data 504. As described herein, session data element 516 may identify and characterize the structure and composition of input data element 510 and the expected response to the input data element 510, e.g., the requested customer address. Executed monitoring engine 440 may parse response 522 to detect the presence of the requested customer address and further, to determine that the behavior of the candidate configuration of target programmatic interface 404 when consuming input data element 418 (e.g., as implemented by executed programmatic bot 512A) is consistent with the expected behavior associated with the composition and structure of input data element 510. Based on the determined consistency, executed monitoring engine 440 may generate data indicative of the determined consistency, e.g., consistency flag 536, and store consistency flag 536 in a portion of session data store 430 associated with group 530.

Executed monitoring engine 440 may also access group 532 within session data store 430, which includes session data element 518, response 524, and candidate configuration data 506, and perform any of the exemplary processes described herein to determine that response 524 includes or represents the "expected" behavior or response associated with the corresponding candidate configurations of target programmatic interface 404 and the composition and structure of input data element 513. Based on the determined consistency, executed monitoring engine 440 may generate data indicative of the determined consistency, e.g., consistency flag 538, and store consistency flag 538 in a portion of session data store 430 associated with group 532.

Further, executed monitoring engine 440 may also access group 534 within session data store 430, which includes session data element 520, response 526, and candidate configuration data 508, and perform any of the exemplary processes described herein to determine that response 526 neither includes nor represents the "expected" behavior or response associated with the corresponding candidate configurations of target programmatic interface 404 and the composition and structure of input data element 514. For example, and based on session data element 520, executed monitoring engine 440 may determine that the expected response to input data element 514 includes the requested customer address, but that response 526 either fails to include the requested customer address (e.g., a "null" value or a different element of customer data), or includes an error message. As such, executed monitoring engine 440 may determine that response 526 represent a deviation from the candidate configuration of target programmatic interface 404 (e.g., as implemented by executed programmatic bot 512C in accordance with candidate configuration data 508), and executed monitoring engine 440 may perform any of the exemplary processes described herein to generate data indicative of the determined deviation, e.g., exception flag 540, and store exception flag 540 in a portion of session data store 430 associated with group 534.

Executed monitoring engine 440 may repeat these exemplary exception-determination processes for each additional or alternate group of responses, session data elements, and candidate configuration data maintained within session data store 430. For example, executed monitoring engine 440 may generate and store, for each additional or alternate group within data session data store 430, a consistency flag indicative of a determined consistency between the actual and expected behavior of the corresponding candidate configuration of target programmatic interface 404, or an exception flag indicative of a determined deviation between the actual and expected behavior of the corresponding candidate configuration of target programmatic interface 404. e.g., at predetermined intervals or continuously in real time.

Further, in some examples, executed monitoring engine 440 may further parse session data store 430 to identify each group of responses, session data elements, and candidate configuration data associated with a corresponding exception flag, including group 534, and to package each group and corresponding exception flag within a portion of exception data 542. Additionally, executed monitoring engine 440 may perform additional operations that generate an exception metric 544 indicative of an incidence of the determined exceptions among the group of responses, session data elements, and candidate configuration data within session data store 430, and as such, the determined instances of deviations between the actual and expected behavior of the candidate implementations of target programmatic interface 404, e.g., at predetermined intervals or continuously in real time. In some instances, exception metric 544 may include a numerical value indicative of a portion of the stored pairs of session data elements and corresponding responses associated with an exception flag (e.g., a percentage value ranging from zero to one hundred, a fractional value ranging from zero to unity), and executed monitoring engine make package exception metric 544 into a corresponding portion of exception data 542.

Executed monitoring engine 440 may perform operations that cause FI computing system 130 to transmit exception data 542, including exception metric 544, across communications network 120 to one or more devices or computing systems associated with a developer of target programmatic interface 404, e.g., developer device 470. In some instances, one or more applications executed by developer device 470 may receive and process exception data 542, and may perform operations and render all, or a selected portion, of exception data 542, including exception metric 544, to the developer within a corresponding digital interface 472. Based on the presented portions of exception data 544, including exception metric 464, the developer may elect to modify elements of processing logic 410 of one or more of executed programmatic bots 412A, 412B, and 412C (e.g., elements 410, 410B, or 410C of processing logic), or may elect to modify or discard certain candidate configurations of software libraries 406 (e.g., associated with one or more of candidate configuration data 504, 506, or 508), to deactivate one or more of virtual machines 502.

Further, in some examples, executed predictive module 474 may access exception data 542, including exception metric 544, and may perform operations that apply one or more trained machine learning or artificial intelligence models or processes to structured input data that includes all, or a selected subset of exception data 542, including exception metric 544. Examples of the trained machine learning and artificial intelligence models include, but are not limited to, an artificial neural network model, a supervised learning model, such as a decision tree algorithm or a random forest algorithm, an unsupervised learning model, a support vector machine (SVM) algorithm, or one or more deep-learning algorithms or models.

Based on the application of the one or more trained machine learning or artificial intelligence models or algorithms to the input data (e.g., that includes exception data 542 and exception metric 544), executed prediction module 474 may identify one or more modifications to the candidate configurations of software libraries 406 that, if implemented, may reduce a future likelihood of deviations from the expected behavior of target programmatic interface 404. For example, as illustrated in FIG. % C, executed predictive module 474 may package information identifying each of the candidate modifications within a corresponding portion of modification data 546, which executed predictive module 474 may provide as an input to executed code modification engine 478.

Executed code modification engine 478 may receive modification data 546, which identifies and characterizes each of the identified modifications to the candidate configurations of software libraries 406 and as such, to the candidate configurations of target programmatic interface 404. Executed code modification engine 478 may also perform operations to modify or alter selected ones of candidate configuration data 504, 506, and 508, or to generate additional elements of candidate configuration data, that reflect the identified modification. As described herein, through the implementation of the identified modifications, certain of the exemplary processes described herein may dynamically and adaptively modify the operations or functionalities of the candidate configurations of target programmatic interface 404, thus reducing the likelihood of future deviations between the expected and actual behavior of the candidate configurations of target programmatic interface 404. Further, one or more of exception data 542, exception metric 544, and modification data 546 may be accessed by executed prediction module 474 and packaged into additional elements of training data (e.g., not illustrated in FIG. 5C), with which executed predictive module 474 may further train, and adaptively improve, the machine learning or artificial intelligence processes described herein.

Further, in some instances, certain of the exemplary RPA-based testing and monitoring processes may be iteratively repeated until a generated value of exception metric 544 (e.g., as generated by executed monitoring engine 440 using any of the exemplary processes described herein) falls below a predetermined threshold value for one of the candidate configurations of target programmatic interface 404. Based on the determination that the repetitively or iteratively generated value of exception metric 544 falls below the predetermined threshold value, certain of the exemplary processes described herein may deem the corresponding candidate configuration of target programmatic interface 404 ready for integration with application programs executed by legacy computing system 480 and the one or more additional computing systems associated with the financial institution or the unrelated third parties, and that the corresponding candidate configuration represents an "optimal" configuration to achieve the functionalities of target programmatic interface 404.

Figure 6:
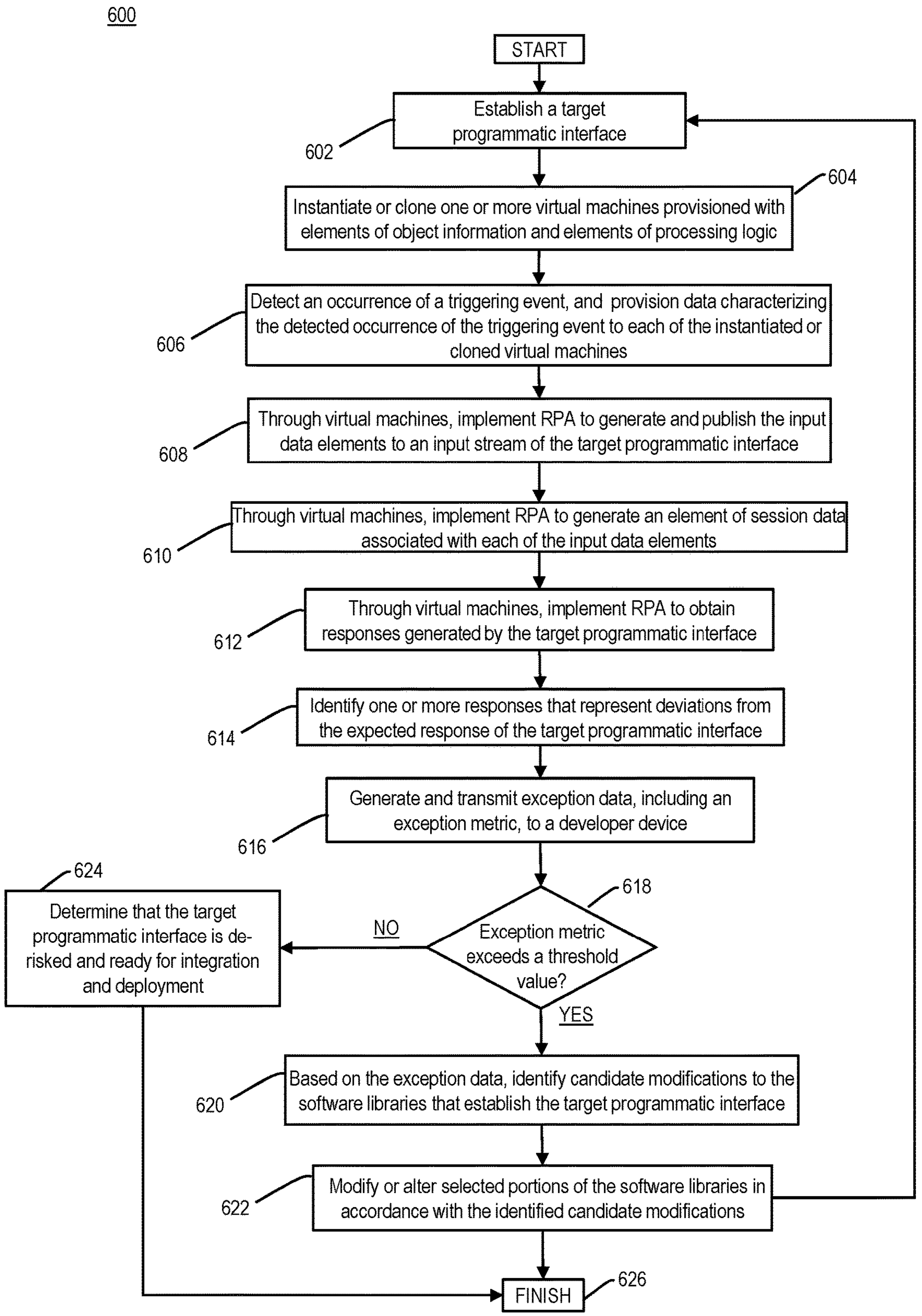
FIG. 6 is a flowchart of an exemplary process for testing and de-risking of programmatic interfaces using robotic process automation, in accordance with some exemplary embodiments.

FIG. 6 is a flowchart of an exemplary process 600 for testing and de-risking of programmatic interfaces using robotic process automation, in accordance with disclosed exemplary embodiments. For example, a network-connected computing system operating within environment 100, such as FI computing system 140, may perform one or more of the steps of exemplary process 600, which, among other things, include establishing a target programmatic interface characterized by a particular target state and a particular technical blueprint, instantiating one or more virtual machines and provisioning the one of more virtual machines with corresponding elements of object and action data and elements of processing logic, and through an execution of one or more programmatic software robots ("bots") by these virtual machines, implementing robotic process automation (RPA) techniques to generate input data elements of varying structure and composition for consumption by the target programmatic interface, to obtain responses from the target programmatic interface to each of the generated input data elements, and based on a comparison of the obtained responses to each of the generated input data element and expected responses to each of the generated input data element, to perform operations that test a functionality, operation, reliability, and security of the target programmatic interface.

Referring to FIG. 6, FI computing system 130 may perform any of the exemplary processes described herein to establish a target programmatic interface having a particular target state and a particular technical blueprint (e.g., in step 602). As described herein, the target programmatic interface may include, but is not limited to, an application programming interface (API) that enables one or more computing systems of the financial institution, such as FI computing system 130, or one or more computing systems associated with unrelated third parties, to interact programmatically with corresponding legacy computing system associated with or operated by the financial institution.

In some examples, the target programmatic interface may be associated with or established by one or more software libraries that collectively establish and facilitate permitted interactions between the legacy computing systems and the one or more computing systems of the financial institution or of the unrelated third, e.g., via corresponding executed application programs. As described herein, the software libraries may include elements of executable code, subroutines, and class, value, or type specifications, along with configuration data and elements of documentation or help data that collectively establish one or more configurations of the target programmatic interface, which may be associated with a particular target functionality, or a particular combination of target functionalities, that facilitate specific types of interactions between the legacy computing system and the one or more computing systems of the financial institution or of the unrelated third parties. The one or more target functionalities and as such, the one or more configurations of the target programmatic interface may each be associated with elements of input data having a specified composition and/or structure.

Further, upon processing input data having that the specified composition or structure associated with a particular functionality or implementation, the target programmatic interface may perform operations and generate corresponding elements of output data consistent with the particular functionality or implementation, e.g., in accordance with an "expected" behavior that produces an "expected" outcome. In some instances, the target programmatic interface may also be associated with one or more elements of specification data that identify and characterize the structure or composition of the set of input data elements associated with each of the particular functionalities or configurations of the target programmatic interface and further, that identify and characterize an expected output or behavior associated with each of these configurations.

In one example, the target programmatic interface may be established by, associated with, and operate in accordance with a particular configuration of the software libraries and as such, may be associated with a technical blueprint indicative of that particular configuration. In other examples, described herein, the target programmatic interface may be associated with a plurality of candidate configurations of the software libraries, and additional virtual machines instantiated or cloned by FI computing system 130 may perform operations consistent with respective ones of these candidate configurations and may establish "virtualized" programmatic interfaces that operate in accordance with respective ones of these candidate configurations.

Referring back to FIG. 6, FI computing system 130 may perform any of the exemplary processes described herein to instantiate one or more virtual machines provisioned with elements of object information and elements of processing logic, and additionally, or alternatively, to clone one or more previously instantiated and provisioned virtual machines (e.g., in step 604). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects.

FI computing system 130 may perform any of the exemplary processes described herein to detect an occurrence of a triggering event, and to provision data characterizing the detected occurrence of the triggering event to each of the instantiated or cloned virtual machines (e.g., in step 606).

Further, and upon execution by FI computing system 140, the each of the programmatic bots established by each of the instantiated or cloned virtual machines may implement any of the exemplary RPA-based techniques described herein (e.g., in accordance with the provisioned elements of processing logic) to: generate an element of input data and publish the input data element to an input stream of the target programmatic interface (e.g., in step 608); generate an element of session data that characterize a composition or structure of the corresponding input data element and an expected response to that corresponding input data element (e.g., in step 610); and obtain a response of the target programmatic interface to the corresponding input data element and store the response in conjunction with the corresponding session data element (e.g., in step 612).

In some examples, FI computing system 130 may process the stored pairs of session data elements and responses, and may perform any of the exemplary processes described herein to identify one or more responses that represent deviations from the expected response of the target programmatic interface (e.g., in step 614). As described herein, the deviations may represent "exceptions" to an expected behavior of the target programmatic interface, and FI computing system may perform any of the exemplary processes described herein to generate an exception metric indicative of an incidence of the exceptions among the paired elements of session data and responses, and to generate exception data that includes the exception metric, and all or a selected portion of the session data elements and responses associated with the exceptions, which FI computing system 130 may transmit across network 120 to a computing system or device of a developer of the target programmatic interface (e.g., in step 616). As described herein, the exception metric may characterize the determined instances of deviations between the actual and expected behavior of the target programmatic interface during interactions with the executed programmatic bots, e.g., at predetermined intervals or continuously in real time.

FI computing system 130 may also determine if the value of the generated exception metric exceeds a threshold metric value (e.g., in step 618). In some instances, the threshold metric value may be established by the developer of the target, and may represents a predetermined, fixed value or alternatively, may be varied dynamically based on the target state or technical blueprint of the target programmatic interface.

If, for example, FI computing system 130 were to determine that the generated exception metric exceeds the threshold metric value (e.g., step 618; YES), FI computing system 130 may establish that the target programmatic interface is not ready for integration and deployment. As illustrated in FIG. 6, FI computing system 130 may also perform any of the exemplary processes described herein to apply one or more trained machine learning or artificial intelligence models or processes to structured input data that includes all, or a selected subset of the exception data, and based on the application of the one or more trained machine learning or artificial intelligence models or algorithms, identify one or more candidate modifications to the software libraries that, if implemented, may reduce a future likelihood of deviations from the expected behavior of the target programmatic interface (e.g., in step 620).

FI computing system 130 may also perform any of the exemplary processes described herein to modify or alter selected portions of the software libraries in accordance with the identified candidate modifications (e.g., in step 622). As described herein, through the implementation of the identified candidate modifications within the software libraries, certain of the exemplary processes described herein may dynamically and adaptively modify the operations or functionalities of the target programmatic interface, thus reducing the likelihood of future deviations between the expected and actual behavior of the target programmatic interface 404. Exemplary process 600 may then pass back to step 602, and FI computing system 130 may perform any of the exemplary processes described herein to re-establish the target programmatic interface based on the modified software libraries.

Alternatively, if FI computing system 130 were to determine that the generated exception metric does not the threshold metric value (e.g., step 618; NO), FI computing system 130 may determine that the target programmatic interface is de-risked and ready for integration and deployment the legacy computing system and the one or more additional computing systems associated with the financial institution or the unrelated third parties (e.g., in step 624). Exemplary process 600 is then complete in step 626.

C. Exemplary Computerized Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, application programming interfaces (APIs) 132 and 262, intake module 134, RPA management engine 202, application programs 226 and 234, application front-ends 230 and 238, application back-ends 232 and 240, processing logic 210, 410, and 410A-C, programmatic robots (bots) 224, 412A-C, and 512A-C, compliance module 266, target programmatic interface 404, monitoring engine 440, predictive module 474, code modification module 478, and virtual machine manager 500, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a memory storing instructions; and at least one processor coupled to the memory, the at least one processor being configured to execute the instructions to:

obtain an element of response data from a programmatic interface, the element of response data being generated by the programmatic interface based on an element of input data, the element of input data being consumable by the programmatic interface and having a structure or a composition consistent with a corresponding one of an expected structure of or an expected composition;

determine that the element of response data deviates from an expected response of the programmatic interface to the element of input data; and modify at least one element of code that establishes the programmatic interface based on the determination that the element of response data deviates from the expected response of the programmatic interface.

2. The apparatus of claim 1, wherein the at least one processor is further configured to execute the instructions to provide the element of input data to the programmatic interface, the element of input data comprising event data associated with a triggering event.

3. The apparatus of claim 2, wherein the at least one processor is further configured to execute the instructions to:

access a triggering event queue maintained within the memory, the triggering event queue comprising data associated with a plurality of triggering events, the data associated with each of the triggering events comprising a corresponding element of temporal data; and obtain the event data associated with the triggering event from the triggering event queue based on the corresponding element of temporal data.

4. The apparatus of claim 2, wherein the at least one processor is further configured to execute the instructions to load specification data associated with the programmatic interface from the memory, the specification data characterizing at least one of the expected structure or the expected composition; and generate the element of input data based on the event data associated with the triggering event and the specification data.

5. The apparatus of claim 1, wherein the at least one processor is further configured to execute the instructions to:

detect an error message within the element of response data; and determine that the element of response data deviates from the expected response based on the error message.

6. The apparatus of claim 5, wherein the at least one processor is further configured to execute the instructions to:

establish, based on the error message, that at least one of a structure or a composition of the element of response data deviates from a corresponding one of an expected structure or an expected composition; and determine that the element of response data deviates from the expected response based on the established deviation of the at least one of the structure or the composition of the element of response data from the corresponding one of the expected structure or the expected composition.

7. The apparatus of claim 1, wherein the at least one processor is further configured to execute the instructions to:

obtain, from the memory, an element of session data associated with the element of input data, the element of session data comprising information that characterizes the expected response of the programmatic interface to the element of input data; and based on the element of session data, determine that the element of response data deviates from the expected response of the programmatic interface.

8. The apparatus of claim 1, wherein:

the apparatus further comprises a communications interface coupled to the at least one processor; and the at least one processor is further configured to execute the instructions to:

generate exception data characterizing the deviation;

perform operations that modify at least one functionality of the programmatic interface in accordance with the exception data; and transmit, via the communications interface, at least the exception data to a computing device operable by a developer of the programmatic interface.

9. The apparatus of claim 1, wherein the at least one processor is further configured to execute the instructions to:

generate exception data characterizing the determined deviation, and obtain elements of session data from the memory, each of the elements of session data being associated with an additional element of input data, an additional element of response data, and one of (i) additional exception data indicative of a deviation of the additional element of response data from the expected response or (ii) consistency data indicative of a consistency between the additional element of response data and the expected response;

compute, based on the exception data and on the elements of session data, a value of an exception metric indicative of an incidence of the deviations between additional elements of response data and the expected response of the programmatic interface; and based on a determination that the value of the exception metric exceeds a threshold value, perform operations that modify at least one functionality of the programmatic interface.

10. The apparatus of claim 1, wherein the at least one processor is further configured to execute the instructions to:

apply at least one of a trained machine learning process or artificial intelligence process to at least one of the element of input data, the element of response data, or exception data characterizing the deviation;

based on the application of the trained machine learning process or artificial intelligence process, determine a modification to a portion of a software library associated with the programmatic interface; and access one or more software libraries associated with the programmatic interface, and perform operations that implement the determined modification to the portion of the software library, the implemented modification being associated with a modification to at least one functionality of the programmatic interface.

11. The apparatus of claim 1, wherein the at least one processor is further configured to:

perform operations that instantiate a virtual machine, the virtual machine being provisioned with elements of processing logic; and execute the virtual machine in accordance with the elements of processing logic, the executed virtual machine performing operations that generate the element of input data and provide the element of input data to the programmatic interface.

12. A computer-implemented method, comprising:

obtaining an element of response data from a programmatic interface using at least one processor, the element of response data being generated by the programmatic interface based on an element of input data, the element of input data being consumable by the programmatic interface and having a structure or a composition consistent with a corresponding one of an expected structure of or an expected composition;

determining, using the at least one processor, that the element of response data deviates from an expected response of the programmatic interface to the element of input data; and modifying, using the at least one processor, at least one element of code that establishes of the programmatic interface based on the determination that the element of response data deviates from the expected response of the programmatic interface.

13. The computer-implemented method of claim 12, further comprising providing the element of input data to the programmatic interface using the at least one processor, the element of input data comprising event data associated with a triggering event.

14. The computer-implemented method of claim 12, wherein:

the computer-implemented method further comprises detecting, using the at least one processor, an error message within the element of response data; and the determining comprises determining that the element of response data deviates from the expected response of the programmatic interface based on the error message.

15. The computer-implemented method of claim 12, wherein:

the computer-implemented method further comprises obtaining, using the at least one processor, an element of session data associated with the element of input data from a data repository, the element of session data comprising information that characterizes the expected response of the programmatic interface to the element of input data; and the determining comprises determining, based on the element of session data, that the element of response data deviates from the expected response of the programmatic interface.

16. The computer-implemented method of claim 12, further comprising:

generating exception data characterizing the deviation using the at least one processor;

performing the operations, using the at least one processor, that modify at least one functionality of the programmatic interface in accordance with the exception data; and transmitting, using the at least one processor, at least the exception data to a computing device operable by a developer of the programmatic interface.

17. The computer-implemented method of claim 12, further comprising:

using the at least one processor, generating exception data characterizing the determined deviation and obtaining elements of session data from a data repository, each of the elements of session data being associated with an additional element of input data, an additional element of response data, and one of (i) additional exception data indicative of a deviation of the additional element of response data from the expected response or (ii) consistency data indicative of a consistency between the additional element of response data and the expected response;

using the at least one processor, computing, based on the exception data and on the elements of session data, a value of an exception metric indicative of an incidence of the deviations between additional elements of response data and the expected response of the programmatic interface; and based on a determination that the value of the exception metric exceeds a threshold value, performing operations, using the at least one processor, that modify at least one functionality of the programmatic interface.

18. The computer-implemented method of claim 12, further comprising:

applying, using the at least one processor, at least one of a trained machine learning process or artificial intelligence process to at least one of the element of input data, the element of response data, or exception data characterizing the deviation;

based on the application of the trained machine learning process or artificial intelligence process, determining, using the at least one processor, a modification to a portion of a software library associated with the programmatic interface; and using the at least one processor, accessing one or more software libraries associated with the programmatic interface, and performing operations that implement the determined modification to the portion of the software library, the implemented modification being associated with a modification to at least one functionality of the programmatic interface.

19. The computer-implemented method of claim 12, further comprising:

performing operations that instantiate a virtual machine using the at least one processor, the virtual machine being provisioned with elements of processing logic; and using the at least one processor, executing the virtual machine in accordance with the elements of processing logic, the executed virtual machine performing operations that generate the element of input data and provide the element of input data to the programmatic interface.

20. A tangible, non-transitory computer-readable medium storing instructions that, when executed by at least one processor, cause the at least one processor to perform a method, comprising:

obtaining an element of response data from a programmatic interface, the element of response data being generated by the programmatic interface based on an element of input data, the element of input data being consumable by the programmatic interface and having a structure or a composition consistent with a corresponding one of an expected structure of or an expected composition;

determining that the element of response data deviates from an expected response of the programmatic interface to the element of input data; and modifying at least one element of code that establishes of the programmatic interface based on the determination that the element of response data deviates from the expected response of the programmatic interface.

* * * * *